United States Patent
Nogami et al.

(10) Patent No.: US 9,806,863 B2
(45) Date of Patent: Oct. 31, 2017

(54) COMMUNICATION SYSTEM, MOBILE STATION DEVICE, BASE STATION DEVICE, AND COMMUNICATION METHOD

(71) Applicant: SHARP KABUSHIKI KAISHA, Osaka-shi, Osaka (JP)

(72) Inventors: Toshizo Nogami, Osaka (JP); Shohei Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/325,220

(22) Filed: Jul. 7, 2014

(65) Prior Publication Data

US 2014/0321394 A1    Oct. 30, 2014

Related U.S. Application Data

(63) Continuation of application No. 13/057,258, filed as application No. PCT/JP2009/003785 on Aug. 6, 2009, now Pat. No. 8,817,714.

(30) Foreign Application Priority Data

Aug. 6, 2008  (JP) ................. 2008-203360

(51) Int. Cl.
*H04L 5/00* (2006.01)
*H04W 72/04* (2009.01)
(Continued)

(52) U.S. Cl.
CPC .......... *H04L 5/0044* (2013.01); *H04L 5/0094* (2013.01); *H04L 27/265* (2013.01);
(Continued)

(58) Field of Classification Search
CPC ... H04L 5/0044; H04L 5/0094; H04L 27/265; H04L 27/2636; H04W 72/085; H04W 72/0453
(Continued)

(56) References Cited

U.S. PATENT DOCUMENTS

2008/0153506 A1   6/2008  Yin et al.
2008/0207135 A1   8/2008  Varadarajan et al.
(Continued)

FOREIGN PATENT DOCUMENTS

EP    1 819 118 A2    8/2007
EP    1 855 424 A1    11/2007
(Continued)

OTHER PUBLICATIONS

"Framework for LTE-Advanced air-interface technology development", 3GPP TSG RAN IMT-Advanced Workshop, Apr. 7-8, 2008.
(Continued)

*Primary Examiner* — Kan Yuen
*Assistant Examiner* — Richard Chang
(74) *Attorney, Agent, or Firm* — Birch, Stewart, Kolasch & Birch, LLP

(57) ABSTRACT

A mobile station device transmits channel quality indicators for a plurality of system bands, wherein each of the plurality of system bands includes a plurality of subbands comprising a set of contiguous resource blocks, and wherein each of the channel quality indicators is derived to satisfy a condition assuming a subband of the plurality of subbands, and wherein the number of the resource blocks within the subband is based on a frequency bandwidth of a system band of the plurality of system bands and the system band includes the subband.

6 Claims, 23 Drawing Sheets

(51) Int. Cl.
*H04L 27/26* (2006.01)
*H04W 72/08* (2009.01)

(52) U.S. Cl.
CPC ..... *H04L 27/2636* (2013.01); *H04W 72/0453* (2013.01); *H04W 72/085* (2013.01)

(58) Field of Classification Search
USPC .................. 370/208, 252, 329, 344; 455/450
See application file for complete search history.

(56) References Cited

U.S. PATENT DOCUMENTS

| | | | |
|---|---|---|---|
| 2008/0233966 A1* | 9/2008 | Scheim | H04L 5/0023 455/452.1 |
| 2008/0253484 A1 | 10/2008 | Kakura et al. | |
| 2009/0029710 A1 | 1/2009 | Ochiai et al. | |
| 2009/0245188 A1 | 10/2009 | Fukuoka et al. | |
| 2010/0039950 A1 | 2/2010 | Kazmi | |

FOREIGN PATENT DOCUMENTS

| | | |
|---|---|---|
| EP | 1 983 671 A1 | 10/2008 |
| JP | 2009-218813 A | 9/2009 |
| WO | WO 2006/088082 A1 | 8/2006 |
| WO | WO 2007/091519 A1 | 8/2007 |
| WO | WO 2007/131558 A1 | 11/2007 |

OTHER PUBLICATIONS

3GPP TS 36.300, V8.4.0 (Mar. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); pp. 1-126.
Ericsson, "Carrier Aggregation in LTE-Advanced", TSG-RAN WG1 #53bis, Warsaw, Poland, Jun. 30-Jul. 4, 2008, R1-082468, pp. 1-6, URL http://www.3gpp.org/ftp/tsg_ran/WG1_RL1/TSGR1_53b/Docs/R1-082468.zip.
U.S. Advisory Action issued in U.S. Appl. No. 13/057,258 on Dec. 4, 2013.
U.S. Corrected Notice of Allowance issued in U.S. Appl. No. 13/057,258 on Apr. 25, 2014.
U.S. Final Office Action issued in U.S. Appl. No. 13/057,258 on Aug. 22, 2013.
U.S. Notice of Allowance issued in U.S. Appl. No. 13/057,258 on Apr. 7, 2014.
U.S. Office Action issued in U.S. Appl. No. 13/057,258 on Dec. 21, 2012.

* cited by examiner

FIG. 20

| NUMBER OF RBS, $N^i_{PRB}$ | SUBBAND SIZE $M^i_{SB}$ | NUMBER OF SUBBANDS, $K^i$ |
|---|---|---|
| 4~10 | 1RB | 4~10 |
| 11~20 | 2RB | 6~10 |
| 21~30 | 3RB | 7~10 |

FIG. 22

| NUMBER OF RBS, $N^{all}_{PRB}$ | SUBBAND SIZE $M^{all}_{SB}$ |
|---|---|
| 4~10 | 1RB |
| 11~20 | 2RB |
| 21~30 | 3RB |
| 31~40 | 4RB |

COMMUNICATION SYSTEM, MOBILE STATION DEVICE, BASE STATION DEVICE, AND COMMUNICATION METHOD

This application is a Continuation of copending application Ser. No. 13/057,258, filed on Feb. 2, 2011, which was filed as PCT International Application No. PCT/JP2009/003785 on Aug. 6, 2009, which claims the benefit under 35 U.S.C. §119(a) to Patent Application No. 2008-203360, filed in Japan on Aug. 6, 2008, all of which are hereby expressly incorporated by reference into the present application.

TECHNICAL FIELD

The present invention relates to a communication system, a mobile station device, a base station device, and a communication method.

BACKGROUND ART

Third Generation Partnership Project (3GPP) is a project in which specifications of mobile phone systems are studied and created. 3GPP is based on an evolved network of wideband code division multiple access (W-CDMA) and a global system for mobile communications (GSM).

In 3GPP, a W-CDMA scheme has been standardized as a $3^{rd}$ generation cellular mobile communication scheme and its services have been sequentially initiated. Also, high-speed downlink packet access (HSDPA) having a higher communication rate has been standardized and its services have been initiated.

In 3GPP, evolved universal terrestrial radio access (EUTRA), which is the evolution of 3G radio access technology, has been studied.

In EUTRA, an orthogonal frequency division multiple access (OFDMA) scheme has been proposed as a downlink communication scheme. OFDMA is a scheme of performing multiplexing of users by subcarriers orthogonal to each other.

In the OFDMA scheme, a technique called an adaptive modulation and coding scheme (AMCS) based on adaptive radio link control (link adaptation) of channel coding or the like is applied.

The AMCS is a scheme of switching radio transmission parameters (also referred to as AMC modes) of an error correction scheme, a coding rate of error correction, a data modulation multinary number, and the like in response to channel qualities of mobile station devices so as to efficiently perform high-speed packet data transmission.

The channel qualities of the mobile station devices are fed back to a base station device with use of a channel quality indicator (CQI).

FIG. 23 is a diagram illustrating a channel configuration used in a radio communication system of the related art. This channel configuration is used in a radio communication system such as the EUTRA (see Non-Patent Document 1). The radio communication system shown in FIG. 23 includes a base station device 1000 and mobile station devices 2000a, 2000b, and 2000c. R01 denotes a range where the base station device 1000 is communicable. The base station device 1000 communicates with a mobile station device, which exists in the range R01.

In EUTRA, a physical broadcast channel (PBCH), a physical downlink control channel (PDCCH), a physical downlink shared channel (PDSCH), a physical multicast channel (PMCH), a physical control format indicator channel (PCFICH), and a physical hybrid automatic repeat request (ARQ) indicator channel (PHICH) are used in a downlink through which a signal is transmitted from the base station device 1000 to the mobile station devices 2000a to 2000c.

In EUTRA, a physical uplink shared channel (PUSCH), a physical uplink control channel (PUCCH), and a physical random access channel (PRACH) are used in an uplink through which signals are transmitted from the mobile station devices 2000a to 2000c to the base station device 1000.

FIG. 24 is a diagram showing an example of a band used in the radio communication system of the related art. In FIG. 24, the horizontal axis represents frequency and the vertical axis represents carrier frequency. In FIG. 24, the carrier frequency is f11. The base station device and the mobile station device perform communication using one continuous band W11 in a frequency axis. A method using the above-described band is used in the general radio communication system such as EUTRA.

FIG. 25 is a diagram showing another example of bands used in the radio communication system of the related art. In FIG. 25, the horizontal axis represents frequency. In FIG. 25, the base station device and the mobile station device perform communication using a plurality of discontinuous bands W21 and W22 in the frequency axis (Non-Patent Document 2). As shown in FIG. 25, aggregation is referred to as a composite use of a plurality of discontinuous bands in the frequency axis.

However, in a radio communication system known in the related art, the base station device may not appropriately allocate resource blocks to a user using the mobile station device. Thus, there is a problem in that the mobile station device and the base station device may not perform efficient communication.

Non-Patent Document 1: 3GPP TS (Technical Specification) 36.300, V8.4.0 (2008-03), Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

Non-Patent Document 2: "Framework for LTE-Advanced air-interface technology development" 3GPP TSG RAN IMT-Advanced Workshop REV-080020, April 2008

DISCLOSURE OF INVENTION

Problem to be Solved by the Invention

The present invention has been made in view of the above-described circumstances, and an object of the invention is to provide a communication system, a mobile station device, a base station device, and a communication method that enable the mobile station device and the base station device to perform efficient communication by appropriately allocating resource blocks at the base station.

Means for Solving the Problem (1) The present invention has been made to solve the above-described problems. According to an aspect of the present invention, there is provided a communication system including a base station device and a mobile station device, wherein the base station device includes: a signal transmission unit which transmits a signal in which data is assigned in a natural number of resource blocks located in a frequency axis in each of a plurality of bands and a signal including information specifying the plurality of bands to the mobile station device, and the mobile station device includes: a signal reception unit which receives the signal including the information specifying the plurality of bands from the signal transmission unit via any of the plurality of bands, and receives the signal in which the data is assigned in the natural number of resource blocks located in the frequency axis in each of the plurality of bands from the signal transmission unit based on the information specifying the plurality of bands; and a data extraction unit which extracts data from the signal in which the data is assigned in the natural number of resource blocks located in the frequency axis received by the signal reception unit.

(2) In the communication system according to the aspect of the present invention, the signal transmission unit may transmit a signal in which data is assigned in a natural number of subbands located in the frequency axis in each of the plurality of bands to the mobile station device.

(3) In the communication system according to the aspect of the present invention, the signal transmission unit may determine a subband bandwidth in each of the plurality of bands in response to the natural number of subbands located in the frequency axis.

(4) In the communication system according to the aspect of the present invention, the signal transmission unit may determine the number of subbands in each of the plurality of bands in response to the natural number of subbands located in the frequency axis.

(5) According to another aspect of the present invention, there is provided a communication system including a base station device and a mobile station device, wherein a signal is transmitted from the base station device to the mobile station device by assigning data in a natural number of resource blocks located in a frequency axis in each of a plurality of bands.

(6) According to still another aspect of the present invention, there is provided a mobile station device which communicates with a base station device, the mobile station device including: a signal reception unit which receives a signal including information specifying a plurality of bands from the base station device via any of the plurality of bands, and receives a signal in which data is assigned in the natural number of resource blocks located in a frequency axis in each of the plurality of bands from the base station device based on the information specifying the plurality of bands; and a data extraction unit which extracts data from the signal in which the data is assigned in the natural number of resource blocks located in the frequency axis received by the signal reception unit.

(7) In the mobile station device according to the aspect of the present invention, the mobile station device may include: a channel estimation unit which estimates channel quality of a natural number of subbands in each of the plurality of bands, wherein the signal reception unit receives the signal including the information specifying the plurality of bands from the base station device via any of the plurality of bands, and receives a signal in which data is assigned in the natural number of subbands located in the frequency axis in each of the plurality of bands from the base station device based on the information specifying the plurality of bands; and the data extraction unit extracts data from the signal in which the data is assigned in the natural number of subbands located in the frequency axis received by the signal reception unit.

(8) In the mobile station device according to the aspect of the present invention, the signal including the information specifying the plurality of bands may be inserted into only any of the plurality of bands, and the signal reception unit may detect and receive the signal including the information specifying the plurality of bands.

(9) According to still another aspect of the present invention, there is provided a base station device which communicates with a mobile station device, the base station device including: a signal transmission unit which transmits a signal in which data is assigned in a natural number of resource blocks located in a frequency axis in each of a plurality of bands and a signal including information specifying the plurality of bands to the mobile station device.

(10) In the base station device according to the aspect of the present invention, the signal transmission unit may transmit the signal including the information specifying the plurality of bands to the mobile station device via only any of the plurality of bands.

(11) According to still another aspect of the present invention, there is provided a communication method using a base station device and a mobile station device, the communication method including: transmitting, by the base station device, a signal in which data is assigned in a natural number of resource blocks located in a frequency axis in each of a plurality of bands and a signal including information specifying the plurality of bands to the mobile station device, receiving, by the mobile station device, the signal including the information specifying the plurality of bands from the base station device via any of the plurality of bands, and receiving the signal in which the data is assigned in the natural number of resource blocks located in the frequency axis in each of the plurality of bands from the base station device based on the information specifying the plurality of bands; and extracting, by the mobile station device, data from the signal in which the data is assigned in the natural number of resource blocks located in the frequency axis received in the signal reception.

Effect of the Invention

In a communication system, a mobile station device, a base station device, and a communication method of the present invention, the mobile station device and the base station device can perform efficient communication by appropriately allocating resource blocks at the base station.

BRIEF DESCRIPTION OF THE DRAWINGS

FIG. 20 is a diagram showing an example of a subband arrangement method used in the third embodiment of the present invention.

FIG. 22 is a diagram showing another example of a subband arrangement method used in the third embodiment of the present invention.

BEST MODE FOR CARRYING OUT THE INVENTION

A radio communication system of the present invention includes a mobile station device and a base station device.

Before description of first to third embodiments of the present invention, an outline of the present invention will first be described.

Figure 1:
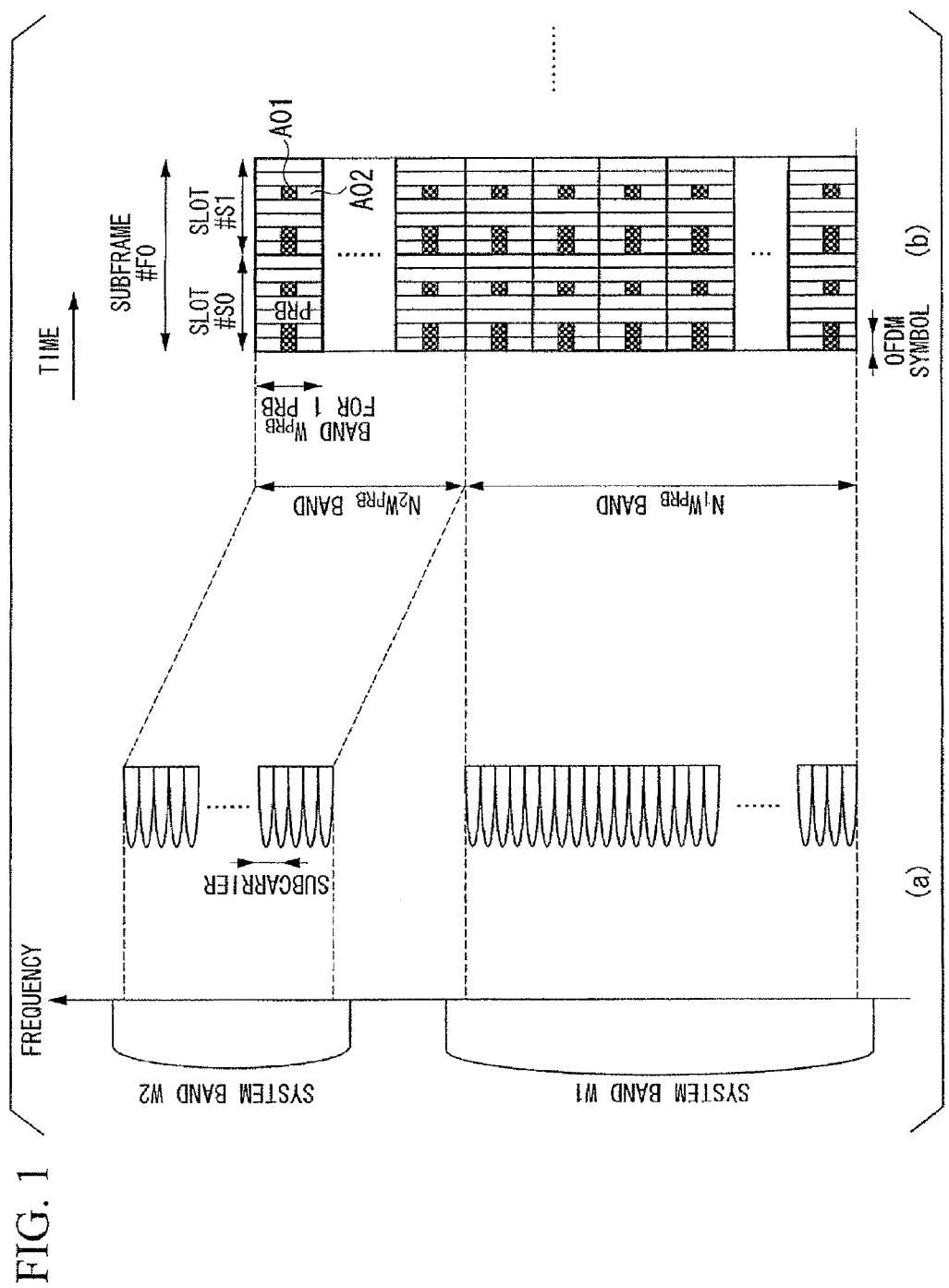
FIG. 1 is a diagram showing a method of arranging physical resource blocks (PRBs) according to an embodiment of the present invention.

FIGS. 1(a) and 1(b) are diagrams showing a PRB arrangement method according to an embodiment of the present invention. Here, an example of a method of arranging PRBs, which are allocation units of a user, in a broadband system using a plurality of discontinuous system bands (occupancy bands) will be described. In FIG. 1(a), the vertical axis represents frequency. In FIG. 1(b), the horizontal axis represents time and the vertical axis represents frequency.

As shown in FIG. 1(a), a plurality of system bands (here, system bands W1 and W2) are used when the base station device and the mobile station device perform communication in the present invention. A plurality of subcarriers are included in each of the system bands W1 and W2.

FIG. 1(b) shows an example of a configuration of a subframe (subframe #F0 whose subframe number is 0), which is a transmission unit in orthogonal frequency division multiple (OFDM) that is a type of multicarrier communication scheme.

One subframe includes at least one slot. Here, for example, subframe #F0 includes two slots #S0 and #S1.

The slot includes at least one OFDM symbol. Here, for example, one slot #S0 or #S1 includes 7 OFDM symbols.

One slot is divided into a plurality of blocks in a frequency axis. A predetermined number of subcarriers constitute one PRB as a unit of the frequency axis.

A unit constituted by one subcarrier and one OFDM symbol is referred to as a resource element. A modulation symbol or the like is mapped to each resource element by resource mapping processing in a physical layer.

As described above, PRBs are regions into which a subframe, which is a transmission unit, is divided in a grid pattern on two dimensions of the frequency and the time. Hereinafter, the case where each PRB has a uniform bandwidth $W_{PRB}$ in the frequency axis will be described. As shown in FIG. 1(b), a downlink reference signal A01 or a physical downlink channel A02 is arranged in the PRB.

Figure 25:
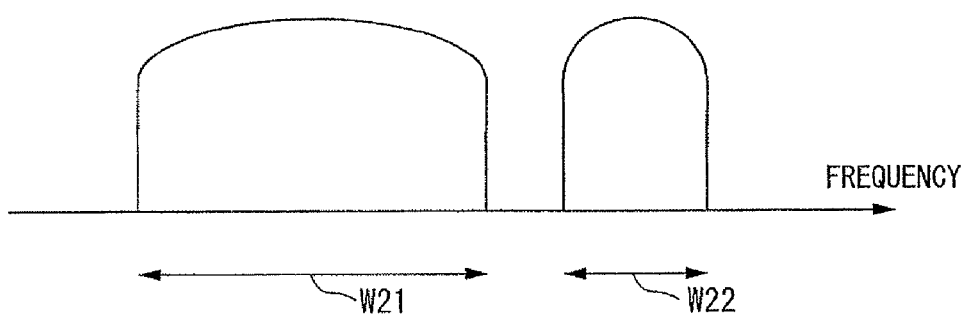
FIG. 25 is a diagram showing another example of bands used in the radio communication system of the related art.

When one broadband system is operated by compositely using a plurality of discontinuous bands W21 and W22 as shown in FIG. 25 described in the related art, a natural number of PRBs are arranged in each of the plurality of bands W1 and W2 on the frequency axis in the embodiment of the present invention. FIGS. 1(a) and 1(b) show the case where the system uses two downlink bands of the system band W1 and the system band W2. $N_1$ ($N_1$ is a natural number) PRBs are arranged in the system band W1, and $N_2$ ($N_2$ is a natural number) PRBs are arranged in the system band W2.

For example, a system in which the bandwidth of one of the two system bands allowed for the system is W1, the bandwidth of the other system band is W2, and $W_{PRB}$ is set to a fixed value to be described. N1 is set to a natural number that is less than or equal to ($W_1/W_{PRB}$), and N2 is set to a natural number that is less than or equal to ($W_2/W_{PRB}$). Thereby, the system bands are used so that PRBs are arranged in a band of $N_1 W_{RPB}$ within the W1 band and PRBs are arranged in a band of $N_2 W_{RPB}$ within the W2 band.

Alternatively, in a system in which $W_{PRB}$ is a parameter capable of being set for each base station device (or each region), which is a transmitter, $W_{PRB}$ may be set as $W1/N_1$ using a predetermined natural number $N_1$ or may be set as $W2/N_2$ using a predetermined natural number $N_2$. Here, W1 and W2 are use bandwidths considering guard bands.

Two examples have been described above, but the present invention is not limited thereto. For example, another method may be used using a plurality of system bands in which PRBs are arranged so that subcarriers within a plurality of different system bands do not exist in one PRB.

Figure 2:
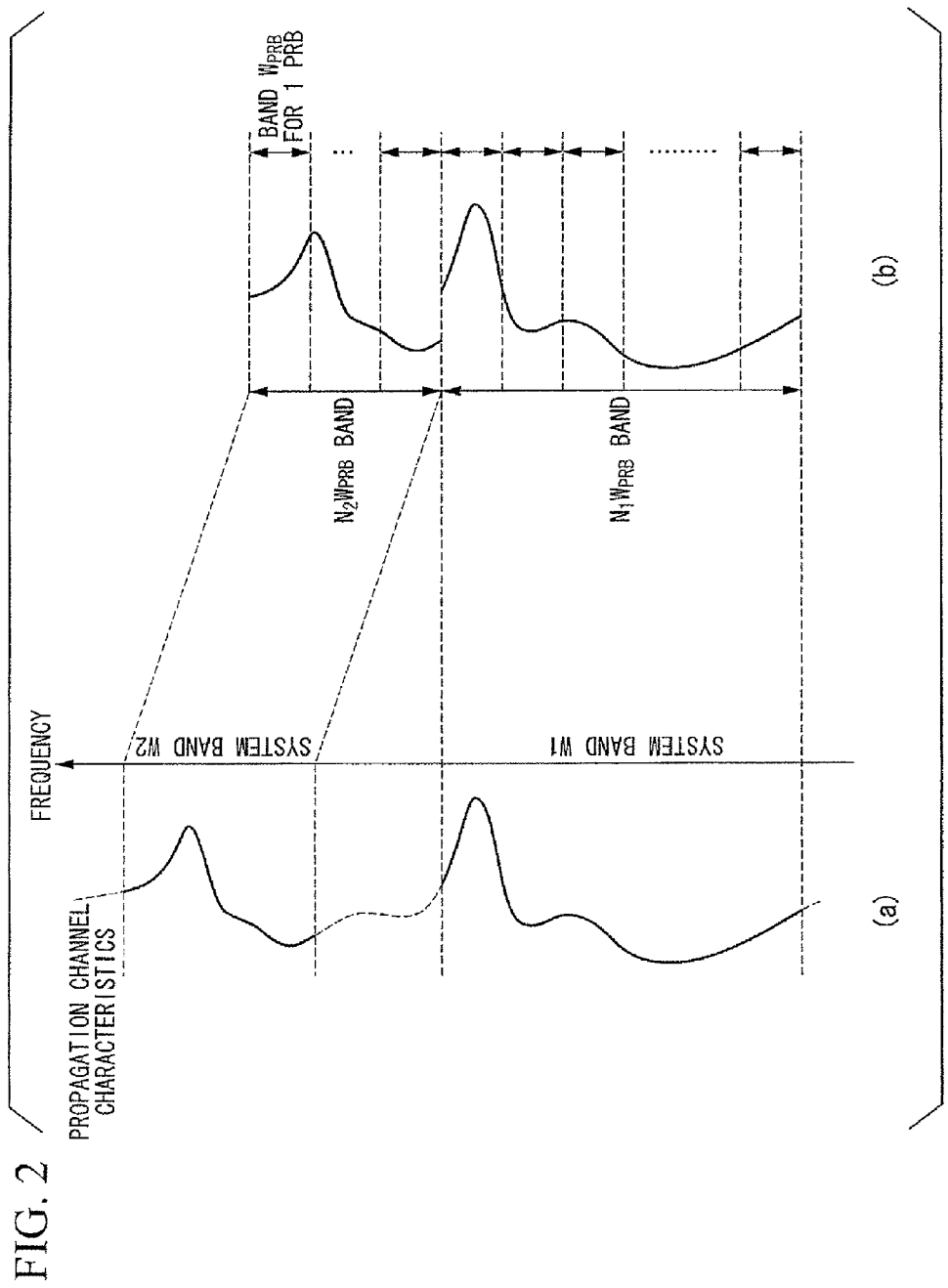
FIG. 2 is a diagram showing an example of propagation channel characteristics within PRBs when a PRB arrangement shown in FIG. 1(b) is performed.

FIGS. 2(a) and 2(b) show an example of propagation channel characteristics within PRBs when the PRB arrangement shown in FIG. 1(b) is performed. In FIGS. 2(a) and 2(b), the vertical axis represents frequency.

FIG. 2(a) shows propagation channel characteristics on the frequency axis including the system band W1 and the system band W2. FIG. 2(b) shows propagation channel characteristics in each PRB. The propagation channel characteristics are discontinuous between a PRB having a highest frequency among PRBs allocated to the system band W1 and a PRB having a lowest frequency among PRBs allocated to the system band W2.

However, PRBs are arranged so that the PRBs do not straddle a plurality of system bands in the embodiment of the present invention. Thus, a propagation channel characteristic in the inside of the PRB becomes continuous in any PRB.

Figure 3:
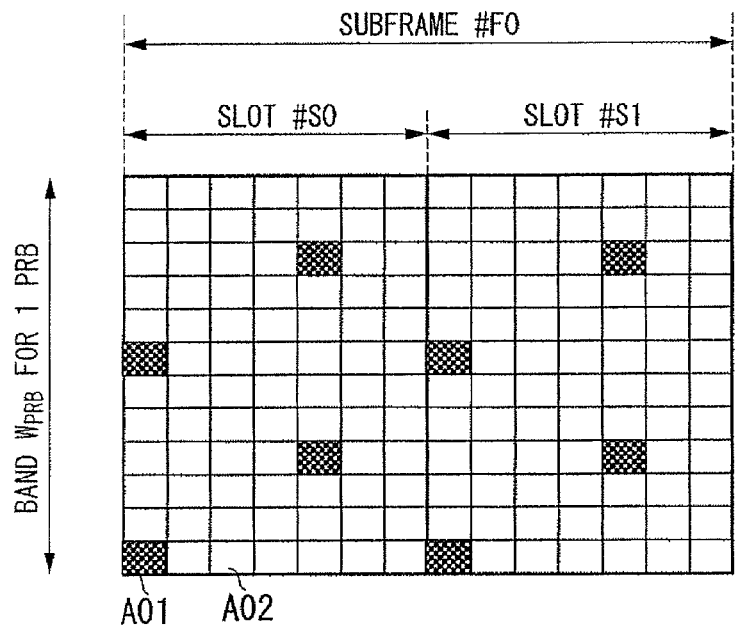
FIG. 3 is a diagram showing an example of a PRB configuration used in an embodiment of the present invention.

FIG. 3 is a diagram showing an example of a PRB configuration used in an embodiment of the present invention. In FIG. 3, the horizontal axis represents time and the vertical axis represents frequency. Subframe #F0 includes slots #S0 and #S1. In FIG. 3, a band of one PRB is $W_{PRB}$.

A downlink reference signal A01 is arranged in a black region and a physical channel A02 is arranged in a white region. The downlink reference signal A01 is a signal known between the base station device 100 and the mobile station device 200. The downlink reference signal A01 is used in propagation channel estimation, reception quality (received power, a received signal to noise power ratio (SNR), or the like) measurement, or the like.

When synchronization detection or the like is performed, a propagation channel estimation value in each resource element within the physical channel is necessary. In general, a propagation estimation value of a resource element is calculated using a propagation channel estimation value of a reference signal. For example, a method using continuity of propagation channel characteristics is used as in the following (1a) to (3a).

(1a) The propagation channel estimation value of the reference signal is directly used as the propagation channel estimation value of each resource element within the physical channel.

(2a) The propagation channel estimation value of each resource element within the physical channel is calculated by interpolating the propagation channel estimation value of the reference signal.

(3a) The propagation channel estimation value of each resource element within the physical channel is calculated by filtering of a minimum mean square error (MMSE) or the like for the propagation channel estimation value of the reference signal.

The methods (1a) to (3a) use the continuity of propagation channel characteristics. Thus, if the propagation channel characteristics within the PRBs are discontinuous, the accuracy of propagation channel estimation is rapidly degraded. However, in the embodiment of the present invention, PRBs are arranged so that the PRBs do not straddle a plurality of system bands. Thus, a propagation channel characteristic in the inside of the PRB becomes continuous in any PRB, and the methods (1a) to (3a) can be directly applied.

In a system in which adaptive scheduling or transmission parameter setting is performed by measuring PRB reception quality, the mobile station device 200 measures the PRB reception quality with use of a reference signal, processes a measurement result, and feeds back the processed measurement result to the base station device 100, so that scheduling or transmission parameter setting corresponding to propagation channel characteristics is performed. At this time, the accuracy of PRB reception quality is significantly affected by the variance (variation) of propagation channel characteristics within the PRBs.

That is, when the variance increases, a difference between reception quality of each resource element within the physical channel and the PRB reception quality increases. Since the variance of propagation channel characteristics increases if the propagation channel characteristics within the PRBs are discontinuous, the accuracy of reception quality measurement is rapidly degraded.

However, in the embodiment of the present invention, PRBs are arranged so that the PRBs do not straddle a plurality of system bands. Thus, since a propagation channel characteristic in the inside of the PRB becomes continuous in any PRB and the variance is relatively small, the accuracy of reception quality measurement can be retained.

In the PRB arrangement used in the embodiment of the present invention, a natural number of PRBs are arranged in each of the plurality of bands on the frequency axis. Thereby, it is possible to prevent the degradation of accuracy of propagation channel estimation or reception quality measurement.

(First Embodiment)

Next, a radio communication system according to a first embodiment of the present invention will be described. The radio communication system includes a base station device 100 (FIG. 10) and a mobile station device 200 (FIG. 11).

Figure 4:
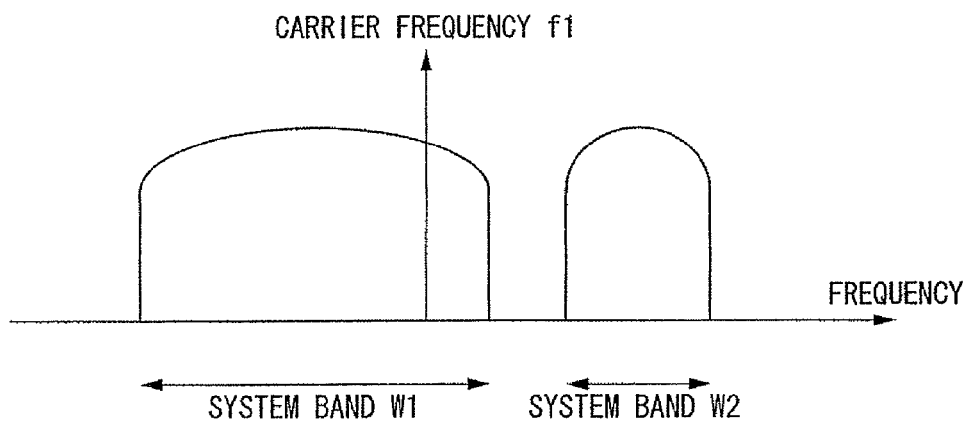
FIG. 4 is a diagram showing an example of bands used in a communication system according to a first embodiment of the present invention.

FIG. 4 is a diagram showing an example of bands used in the communication system according to the first embodiment of the present invention. In FIG. 4, the horizontal axis represents frequency.

As an example of the system using a plurality of system bands in this embodiment, the base station device 100 communicates with the mobile station device 200 with use of system bands W1 and W2 in which a carrier frequency is f1 as shown in FIG. 4. The base station device 100 transmits a signal to the mobile station device 200 by using the system bands W1 and W2 as one carrier.

If synchronization is sufficiently performed by the base station device 100, signals may be respectively transmitted to mobile station devices 200 with use of different carriers.

FIGS. 5(a) and 5(b) are diagrams showing an example of a subframe configuration used in the first embodiment of the present invention. In FIG. 5(a), the vertical axis represents frequency. In FIG. 5(b), the horizontal axis represents time and the vertical axis represents frequency.

As shown in FIG. 5(a), a plurality of system bands (here, system bands W1 and W2) are used when the base station device 100 and the mobile station device 200 perform communication in this embodiment. A plurality of subcarriers are included in each of the system band W1 and the system band W2.

As shown in FIG. 5(b), a subframe #F0 includes two slots #S0 and #S1. Each of the slots #S0 and #S1 includes 7 OFDM symbols.

$N_2$ PRB bands $W_{PRB}$ are included in a band of $N_2 W_{PRB}$ corresponding to the system band W2. In the band of $N_2 W_{PRB}$, a downlink reference signal A01 and a physical downlink channel A02 are arranged.

$N_1$ PRB bands $W_{PRB}$ are included in a band of $N_1 W_{PRB}$ corresponding to the system band W1. In the band of $N_1 W_{PRB}$, the downlink reference signal A01, the physical downlink channel A02, a physical downlink synchronization signal A03, and a PBCH A04 are arranged.

The physical downlink synchronization signal A03 (synchronization channel), which is a synchronization signal, and the PBCH A04, which is a channel including broadcast information, are inserted into any one (here, the system band W1) of the system bands.

The mobile station device 200 performs synchronization by searching for the physical downlink synchronization signal A03, and also acquires information within the PBCH A04. The information within the PBCH A04 includes information indicating a system band (information regarding an aggregation resource region including the system band W2). Using the information, the mobile station device 200 receives the system bands W1 and W2 from the base station device 100.

At this time, $N_1$ PRBs are arranged in the system band W1 and $N_2$ PRBs are arranged in the system band W2. Thereby, a propagation channel characteristic in the inside of the PRB becomes continuous in any PRB. Thus, it is possible to prevent the degradation of accuracy of propagation channel estimation or reception quality measurement.

Hereinafter, the case where the embodiment of the present invention is applied to an EUTRA system using a plurality of system bands based on the EUTRA system will be described.

First, a channel configuration used in the communication system according to the first embodiment of the present invention will be described.

Figure 6:
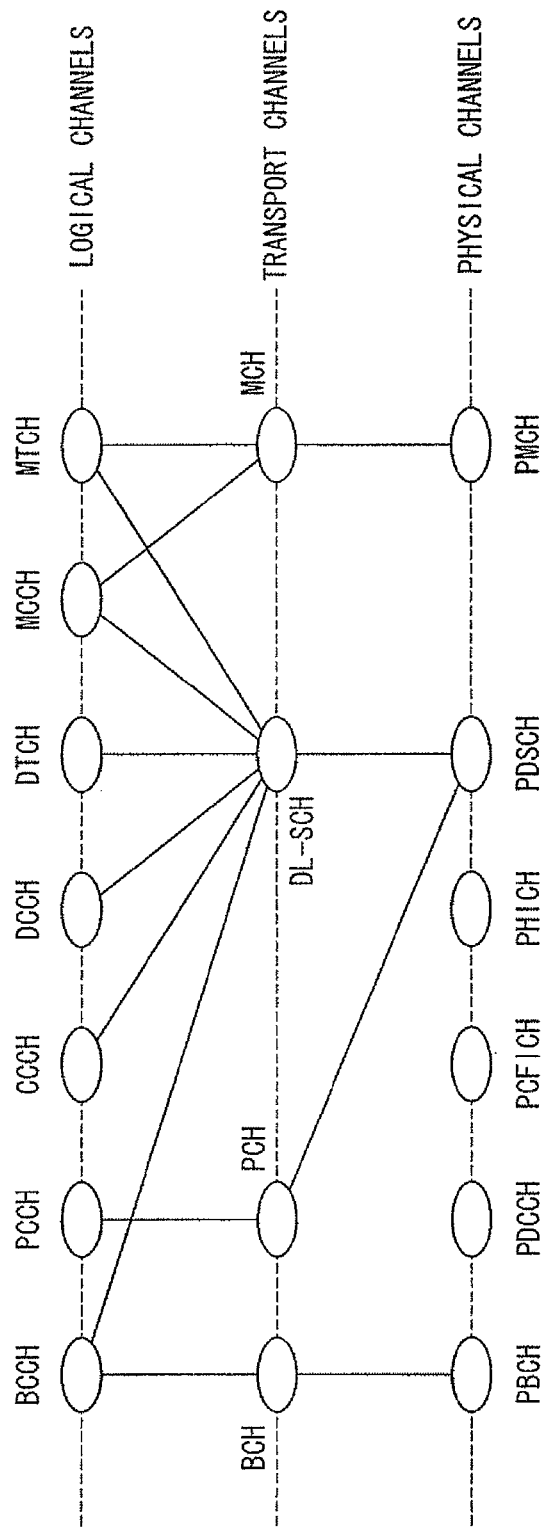
FIG. 6 is a diagram showing a downlink channel configuration used in a communication system according to the first embodiment of the present invention.
Figure 7:
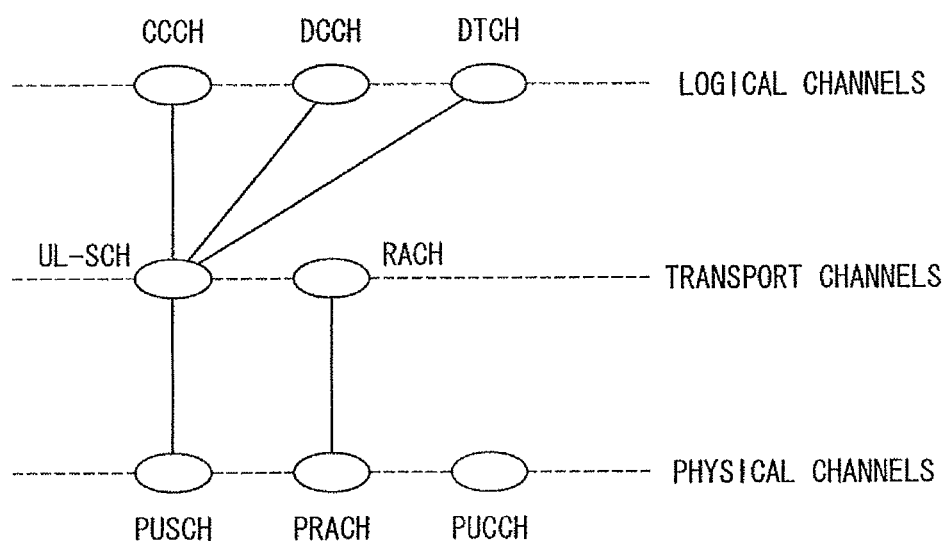
FIG. 7 is a diagram showing an uplink channel configuration used in a communication system according to the first embodiment of the present invention.

FIG. 6 is a diagram showing a downlink channel configuration used in the communication system according to the first embodiment of the present invention. FIG. 7 is a diagram showing an uplink channel configuration used in the communication system according to the first embodiment of the present invention. Downlink channels shown in FIG. 6 and uplink channels shown in FIG. 7 respectively include logical channels, transport channels, and physical channels.

The logical channel defines a type of data transmission service to be transmitted/received to/from a medium access control (MAC) layer. The transport channel defines what is a characteristic of data to be transmitted by a radio interface and how the data is transmitted. The physical channel is a physical channel that carries the transport channel.

The logical channels of the downlink include a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH).

The logical channels of the uplink includes a CCCH, a DCCH, and a DTCH.

The transport channels of the downlink include a broadcast channel (BCH), a paging channel (PCH), a downlink shared channel (DL-SCH), and a multicast channel (MCH).

The transport channels of the uplink include an uplink shared channel (UL-SCH) and a random access channel (RACH).

The physical channels of the downlink include a PBCH, a PDCCH, a PDSCH, a PMCH, a PCFICH, and a PHICH.

The physical channels of the uplink include a PUSCH, a PRACH, and a PUCCH.

Figure 23:
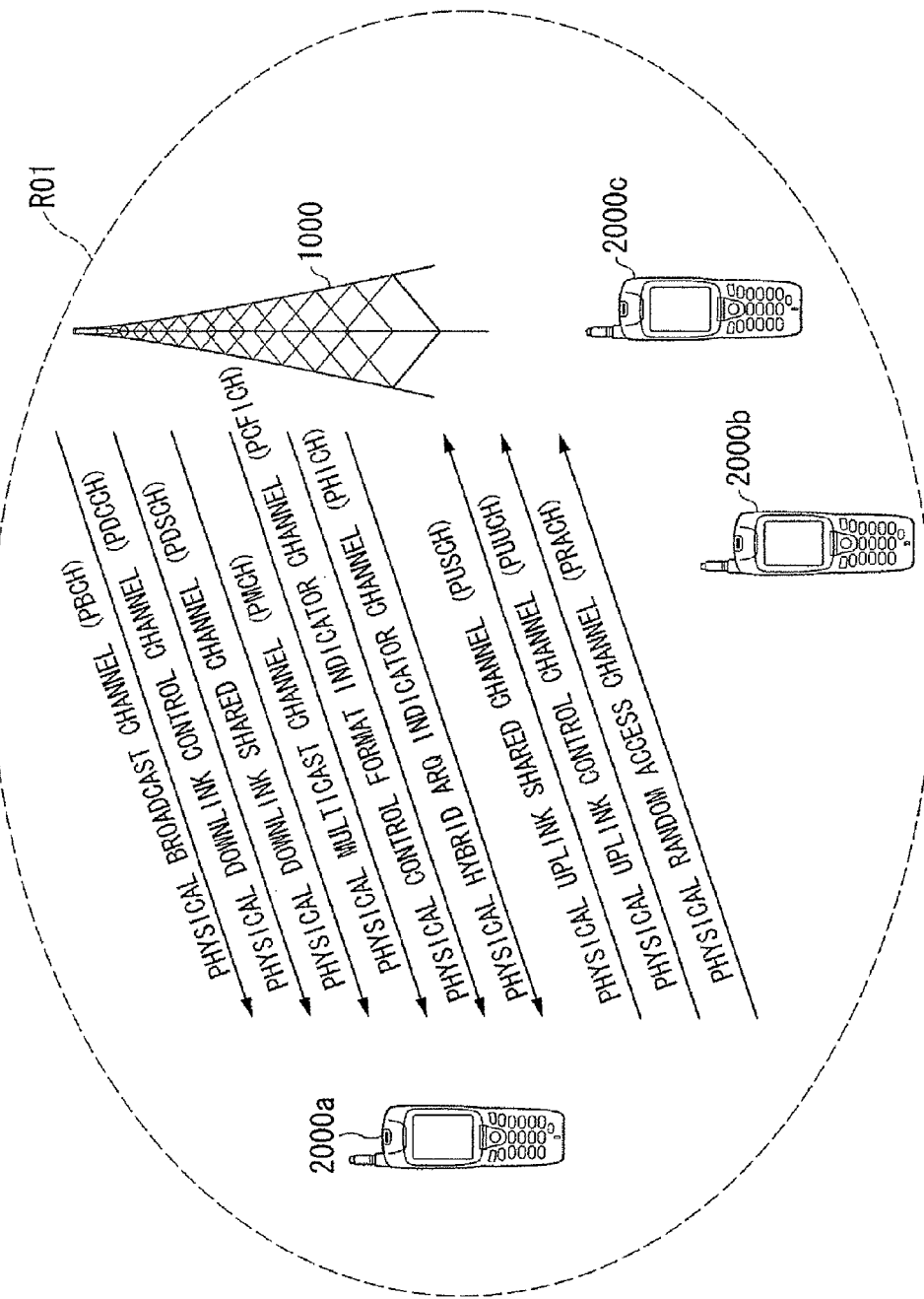
FIG. 23 is a diagram showing a channel configuration used in a radio communication system of the related art.
Figure 24:
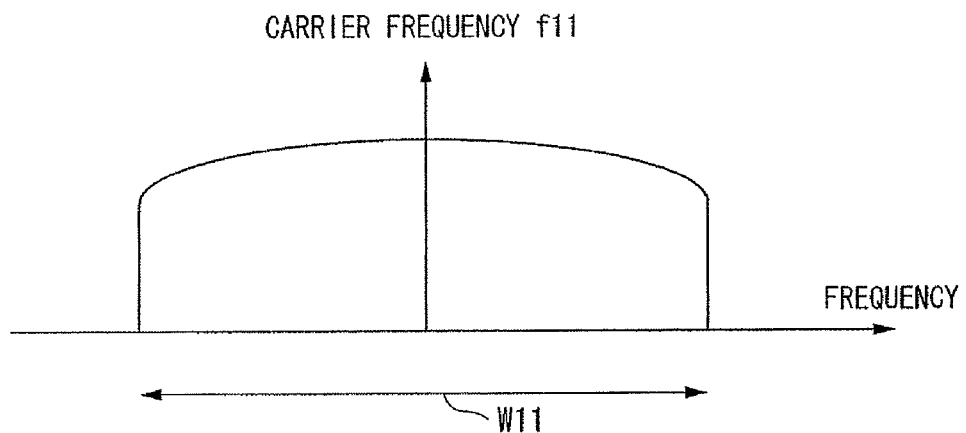
FIG. 24 is a diagram showing an example of a band used in the radio communication system of the related art.

These channels are transmitted and received between the base station device 100 and the mobile station device 200 as shown in FIG. 23 described in the related art.

Next, the logical channels will be described. The BCCH is a downlink channel that is used to broadcast system control information. The PCCH is a downlink channel that is used to transmit paging information, and is used when a network does not know a cell position of the mobile station device.

The CCCH is a channel that is used to transmit control information between the mobile station device and the network, and is used by the mobile station device that does not have a radio resource control (RRC) connection with the network.

The DCCH is a point-to-point two-way channel that is used to transmit individual control information between the mobile station device 200 and the network. The DCCH is used by the mobile station device having the RRC connection.

The DTCH is a point-to-point two-way channel, and is used for transmission of user information (unicast data) in a dedicated channel of one mobile station device.

The MCCH is a downlink channel that is used for point-to-multipoint transmission of multimedia broadcast multicast service (MBMS) control information from the network to the mobile station device 200. This is used for an MBMS service that provides a point-to-multipoint service.

MBMS service transmission methods include single-cell point-to-multipoint (SCPTM) transmission and multimedia broadcast multicast service single frequency network (MB-SFN) transmission.

The MBSFN transmission is a simultaneous transmission technique of simultaneously transmitting identifiable waveforms (signals) from a plurality of cells. On the other hand, the SCPTM transmission is a method of transmitting the MBMS service by one base station device.

The MCCH is used in one or a plurality of MTCHs. The MTCH is a downlink channel that is used for point-to-multipoint transmission of traffic data (MBMS transmission data) from the network to the mobile station device.

The MCCH and the MTCH are used only by a mobile station device, which receives MBMS.

Next, the transport channels will be described. The BCH is broadcast to the entire cell by a fixed and predefined transmission format. In the DL-SCH, hybrid automatic repeat request (HARQ), dynamic adaptive radio link control, discontinuous reception (DRX), and MBMS transmission are supported and need to be broadcast to the entire cell.

In the DL-SCH, beamforming is usable, and dynamic resource allocation and quasi-static resource allocation are supported. In the PCH, the DRX is supported and needs to be broadcast to the entire cell.

The PCH is mapped to a physical resource that is dynamically used for a traffic channel or another control channel, that is, the PDSCH.

The MCH needs to be broadcast to the entire cell. In the MCH, MBSFN combining of MBMS transmissions from a plurality of cells, allocation of a quasi-static resource of a time frame using an extended cyclic prefix (CP), or the like is supported.

In the UL-SCH, HARQ and dynamic adaptive radio link control are supported. In the UL-SCH, beamforming is usable. Dynamic resource allocation and quasi-static resource allocation are supported. In the RACH, limited control information is transmitted and a collision risk exists.

Next, the physical channels will be described. The PBCH maps the BCH at an interval of 40 milliseconds. Blind detection of the timing of 40 milliseconds is applied. That is, for timing presentation, explicit signaling may not be performed. A subframe including the PBCH can be decoded only by the subframe. That is, it is self-decodable.

The PDCCH is a channel that is used to notify a mobile station device of PDSCH resource allocation, HARQ information for downlink data, and uplink transmission permission (uplink grant) in PUSCH resource allocation.

The PDSCH is a channel that is used to transmit downlink data or paging information. The PMCH is a channel that is used to transmit the MCH. A downlink reference signal, an uplink reference signal, and a physical downlink synchronization signal are separately arranged at the PMCH.

The PUSCH is a channel that is used to mainly transmit the UL-SCH. When the base station device 100 schedules the mobile station device 200, a channel feedback report (CFR) (a downlink channel quality indicator (CQI), a precoding matrix indicator (PMI), or a rank indicator (RI)) or an HARQ acknowledgement (ACK)/negative acknowledgement (NACK) to downlink transmission is also transmitted using the PUSCH.

The PRACH is a channel that is used to transmit a random access preamble, and has a guard time. The PUCCH is a channel that is used to transmit the CFR (CQI, PMI, and RI), a scheduling request (SR), an HARQ ACK/NACK to the downlink transmission, and the like.

The PCFICH is a channel that is used to notify the mobile station device of the number of OFDM symbols used for the PDCCH, and is transmitted in each subframe.

The PHICH is a channel that is used to transmit an HARQ ACK/NACK to uplink transmission.

Next, channel mapping by the communication system according to the first embodiment of the present invention will be described.

As shown in FIG. 6, mapping of the transport channel and the physical channel is performed in the downlink as follows. The BCH is mapped to the PBCH.

The MCH is mapped to the PMCH. The PCH and the DL-SCH are mapped to the PDSCH.

The PDCCH, the PHICH, and the PCFICH are independently used at the physical channels.

On the other hand, in the uplink, mapping of the transport channel and the physical channel is performed as follows. The UL-SCH is mapped to the PUSCH.

The RACH is mapped to the PRACH. The PUCCH is independently used at the physical channel.

In the downlink, mapping of the logical channel and the transport channel is performed as follows. The PCCH is mapped to the DL-SCH.

The BCCH is mapped to the BCH and the DL-SCH. The CCCH, the DCCH, and the DTCH are mapped to the DL-SCH.

The MCCH is mapped to the DL-SCH and the MCH. The MTCH is mapped to the DL-SCH and the MCH.

Mapping from the MCCH and the MTCH to the MCH is performed upon MBSFN transmission. On the other hand, this mapping is mapped to the DL-SCH upon SCPTM transmission.

On the other hand, in the uplink, mapping of the logical channel and the transport channel is performed as follows. The CCCH, the DCCH, and the DTCH are mapped to the UL-SCH. The RACH is not mapped to the logical channel.

Next, a frame configuration used in the radio communication system according to the first embodiment of the present invention will be described.

Figure 8:
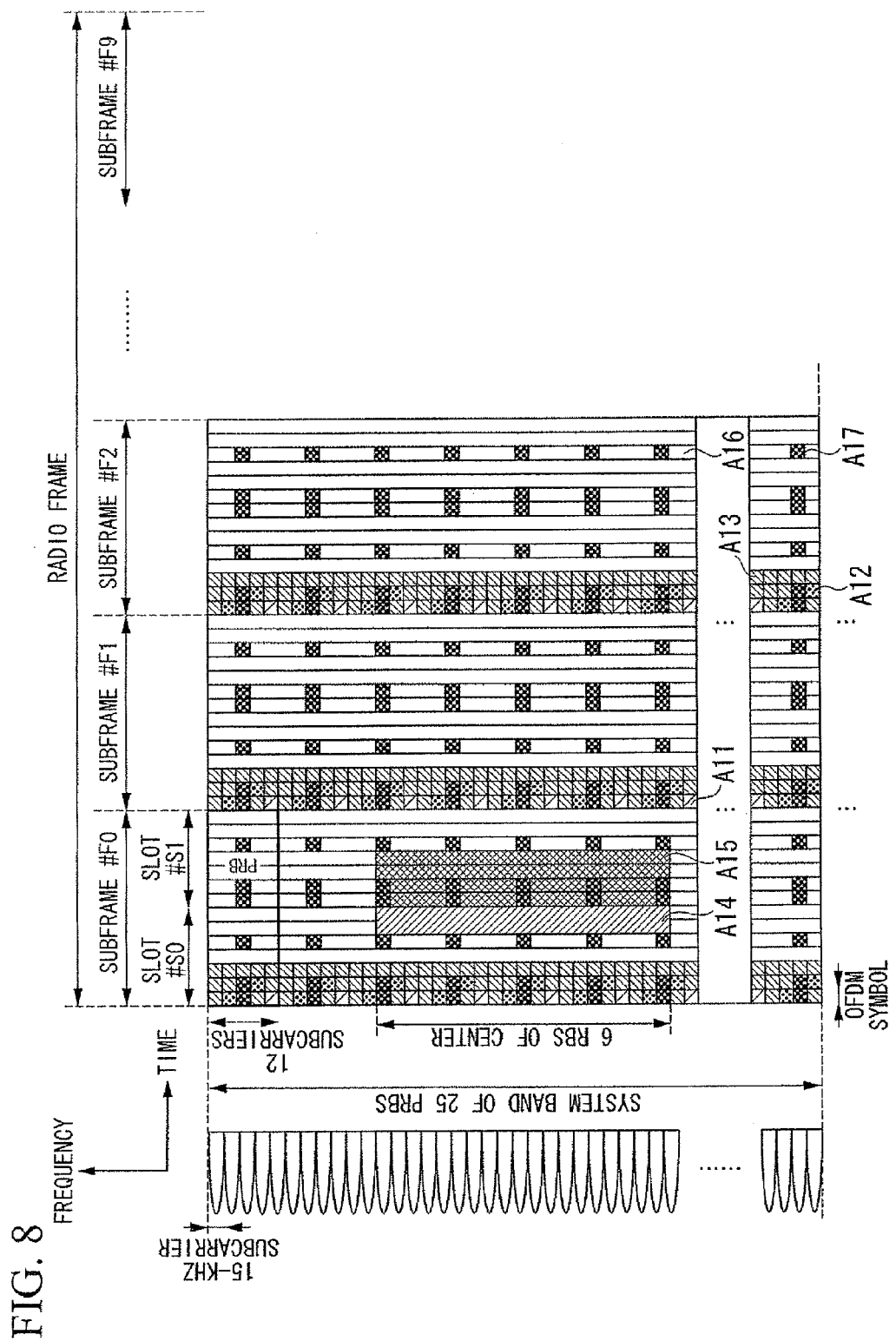
FIG. 8 is a diagram showing a frame configuration used in a downlink of a radio communication system according to the first embodiment of the present invention.
Figure 9:
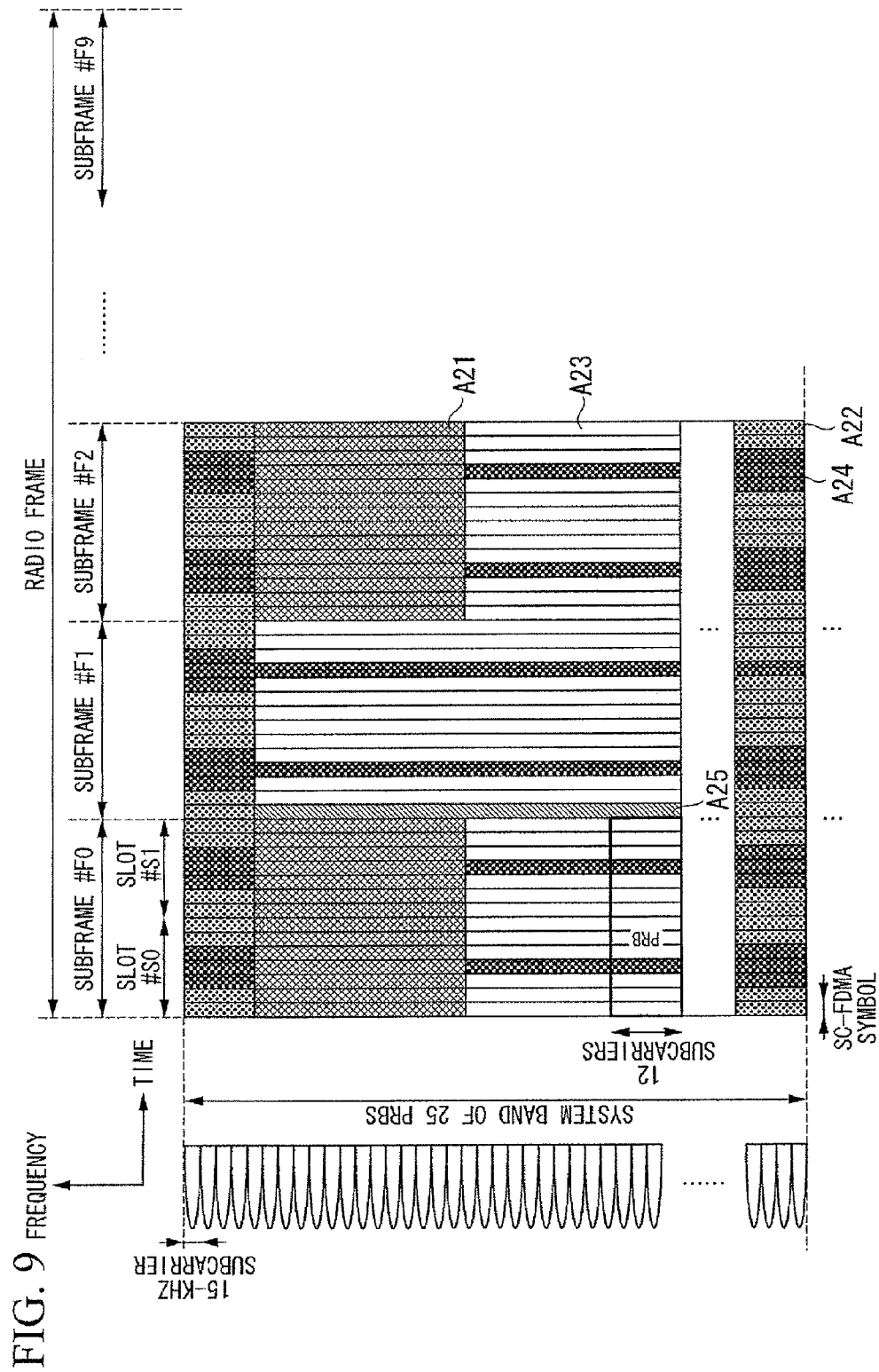
FIG. 9 is a diagram showing a frame configuration used in an uplink of the radio communication system according to the first embodiment of the present invention.

FIG. 8 is a diagram showing a frame configuration used in the downlink of the radio communication system according to the first embodiment of the present invention. FIG. 9 is a diagram showing a frame configuration used in the uplink of the radio communication system according to the first embodiment of the present invention. In FIGS. 8 and 9, the horizontal axis represents time and the vertical axis represents frequency.

A radio frame to be identified by a system frame number (SFN) is constituted by 10 milliseconds (10 ms). One subframe is constituted by 1 millisecond (1 ms). The radio frame includes 10 subframes #F0 to #F9.

As shown in FIG. 8, a PCFICH A11, a PHICH A12, a PDCCH A13, a physical downlink synchronization signal A14, a PBCH A15, a PDSCH/PMCH A16, and a downlink reference signal A17 are arranged in the radio frame that is used in the downlink.

As shown in FIG. 9, a PRACH A21, a PUCCH A22, a PUSCH A23, an uplink demodulation reference signal A24, and an uplink measurement reference signal A25 are arranged in the radio frame that is used in the uplink.

One subframe (for example, subframe #F0) is separated into two slots #S0 and #S1. When a normal CP is used, a downlink slot includes 7 OFDM symbols (see FIG. 8), and an uplink slot includes 7 single carrier-frequency division multiple access (SC-FDMA) symbols (see FIG. 9).

If an extended CP (also referred to as a long CP) is used, the downlink slot includes 6 OFDM symbols and the uplink slot includes 6 SC-FDMA symbols.

One slot is divided into a plurality of blocks in the frequency axis. One PRB is constituted using twelve 15-kHz subcarriers as a unit in the frequency axis. In response to a system bandwidth, 6 to 110 PRBs are supported.

Resource allocations of the downlink and the uplink are performed in a subframe unit in a time axis and a PRB unit in the frequency axis. That is, two slots within a subframe are allocated in one resource allocation signal.

A unit constituting a subcarrier and an OFDM symbol or a unit constituting a subcarrier and an SC-FDMA symbol is referred to as a resource element. In resource mapping processing of a physical layer, a modulation symbol or the like is mapped to each resource element.

In processing of a physical layer of the downlink transport channel, the assignment of 24-bit cyclic redundancy check (CRC) to the PDSCH, channel coding (transmission channel coding), physical-layer HARQ processing, channel interleaving, scrambling, modulation (quadrature phase shift keying (QPSK), 16 quadrature amplitude modulation (16QAM), or 64QAM), layer mapping, precoding, resource mapping, antenna mapping, and the like are performed.

On the other hand, in processing of a physical layer of the uplink transport channel, the assignment of 24-bit CRC to the PUSCH, channel coding (transmission channel coding), physical-layer HARQ processing, scrambling, modulation (QPSK, 16QAM, or 64QAM), resource mapping, antenna mapping, and the like are performed.

The PDCCH, the PHICH, and the PCFICH are arranged in first 3 or fewer OFDM symbols.

In the PDCCH, transport format, resource allocation, and HARQ information for the DL-SCH and the PCH are transmitted. The transport format prescribes a modulation scheme, a coding scheme, a transport block size, and the like.

In the PDCCH, transport format (prescribing a modulation scheme, a coding scheme, transport block size, and the like), resource allocation, and HARQ information for the UL-SCH are transmitted.

A plurality of PDCCHs are supported, and the mobile station device 200 monitors a set of PDCCHs.

The PDSCH allocated by the PDCCH is mapped to the same subframe as that of the PDCCH.

The PUSCH allocated by the PDCCH is mapped to a subframe of a predefined position. For example, if a downlink subframe number of the PDCCH is N, it is mapped to uplink subframe No. N+4.

In uplink/downlink resource allocation by the PDCCH, the mobile station device is specified using 16-bit MAC-layer identification information (MAC ID). That is, the 16-bit MAC ID is included in the PDCCH.

A downlink reference signal (downlink pilot channel) to be used for measurement of a downlink state and demodulation of downlink data is assigned in first and second OFDM symbols of each slot and a third OFDM symbol from behind.

On the other hand, an uplink demodulation reference signal (a demodulation pilot (demodulation reference signal: DRS)) to be used for demodulation of the PUSCH is transmitted in a fourth SC-FDMA symbol of each slot.

An uplink measurement reference signal (a scheduling pilot (sounding reference signal: SRS)) to be used for measurement of an uplink state is transmitted in a first SC-FDMA symbol of a subframe.

A PUCCH demodulation reference signal is defined in each uplink control channel format, and is transmitted in third, fourth and fifth SC-FDMA symbols of each slot or second and sixth SC-FDMA symbols of each slot.

The PBCH and the downlink synchronization signal are arranged in a band of 6 PRBs in the center of the system band. The physical downlink synchronization signal is transmitted in sixth and seventh OFDM symbols of each slot of subframes of a first subframe (subframe #F0) and a fifth subframe (subframe #F4).

The PBCH is transmitted in fourth and fifth OFDM symbols of the first slot (slot #S0) and first and second OFDM symbols of the second slot (slot #S1) of the first subframe (subframe #F0).

The RACH is constituted by a bandwidth of 6 physical resource blocks in the frequency axis and 1 subframe in the time axis. The RACH is transmitted for requests (an uplink resource request, an uplink synchronization request, a downlink data transmission resumption request, a handover request, a connection setup request, a reconnection request, an MBMS service request, and the like) on various reasons from the mobile station device to the base station device.

The PUCCH is arranged in two ends of the system band and is constituted in a PRB unit. Frequency hopping is performed so that the two ends of the system band are alternately used between slots.

Figure 10:
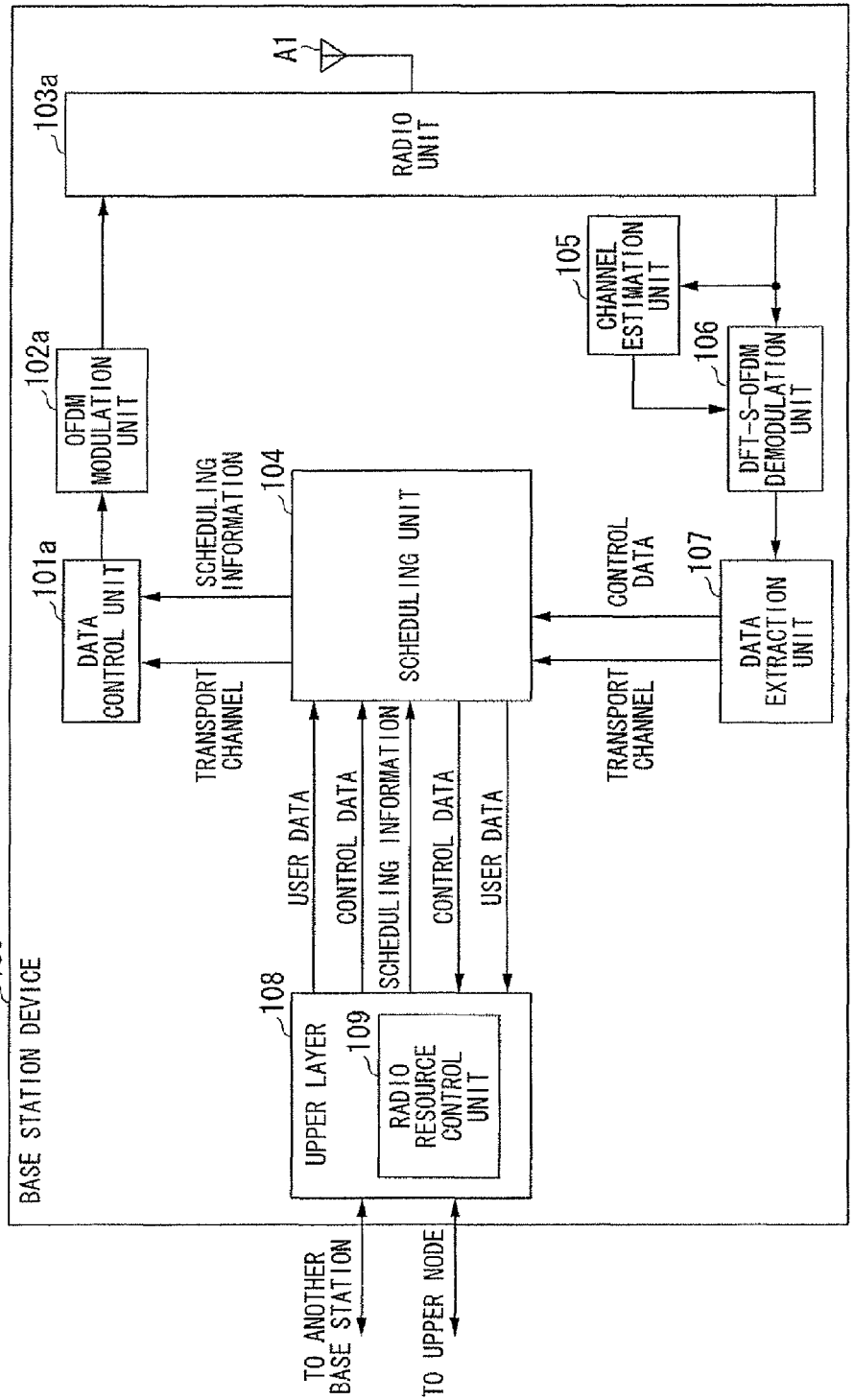
FIG. 10 is a schematic block diagram showing a configuration of a base station device 100 according to the first embodiment of the present invention.
Figure 11:
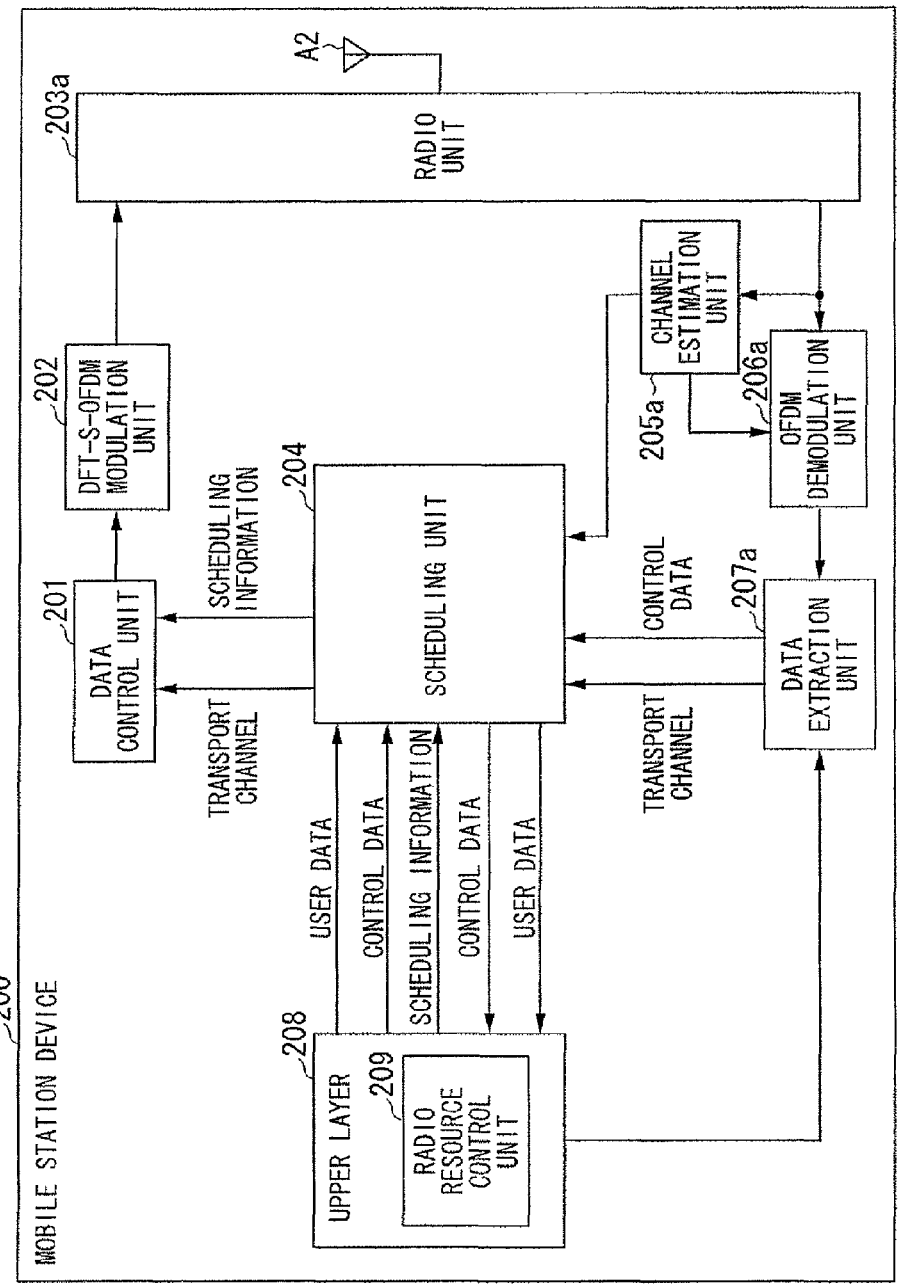
FIG. 11 is a schematic block diagram showing a configuration of a mobile station device 200 according to the first embodiment of the present invention.

FIG. 10 is a schematic block diagram showing a configuration of the base station device 100 according to the first embodiment of the present invention. The base station device 100 includes a data control unit 101a, an OFDM modulation unit 102a, a radio unit 103a, a scheduling unit 104, a channel estimation unit 105, a DFT-S-OFDM (DFT-spread-OFDM) demodulation unit 106, a data extraction unit 107, an upper layer 108, and an antenna unit A1.

The radio unit 103a, the scheduling unit 104, the channel estimation unit 105, the DFT-S-OFDM demodulation unit 106, the data extraction unit 107, the upper layer 108, and the antenna unit A1 constitute a reception unit. The data control unit 101a, the OFDM modulation unit 102a, the radio unit 103a, the scheduling unit 104, the upper layer 108, and the antenna unit A1 constitute a transmission unit.

The radio unit 103a, the channel estimation unit 105, the DFT-S-OFDM demodulation unit 106, and the data extraction unit 107 perform processing of the physical layer of the uplink. The data control unit 101a, the OFDM modulation unit 102a, and the radio unit 103a perform processing of the physical layer of the downlink.

The data control unit 101a acquires the transport channel and scheduling information from the scheduling unit 104. The data control unit 101a maps the transport channel and a signal and a channel generated in the physical layer to the physical channel based on the scheduling information input from the scheduling unit 104. Data mapped as described above is output to the OFDM modulation unit 102a.

The OFDM modulation unit 102a performs OFDM signal processing such as coding, data modulation, serial/parallel conversion of an input signal, inverse fast Fourier transform (IFFT) processing, CP insertion, filtering, and the like for data input from the data control unit 101a based on the scheduling information (including downlink PRB allocation information (including, for example, PRB position information such as a frequency and a time), a modulation scheme and a coding scheme (for example, 16QAM modulation and a 2/3 coding rate) corresponding to each downlink PRB, or the like) input from the scheduling unit 104, generates an OFDM signal, and outputs the OFDM signal to the radio unit 103a.

The radio unit 103a generates a radio signal by up-converting modulation data input from the OFDM modulation unit 102a into a radio frequency, and transmits the radio signal to the mobile station device 200 (see FIG. 11 to be described later) via the antenna unit A1. The radio unit 103a receives an uplink radio signal from the mobile station device 200 via the antenna unit A1, down-converts the uplink radio signal into a baseband signal, and outputs reception data to the channel estimation unit 105 and the DFT-S-OFDM demodulation unit 106.

The scheduling unit 104 performs processing of the MAC layer. The scheduling unit 104 performs mapping of the logical channel and the transport channel, downlink and uplink scheduling (HARQ processing, transport format selection, and the like), and the like.

In downlink scheduling, the scheduling unit 104 performs processing of selection of a downlink transport format (transmission format) (PRB allocation and modulation schemes, a coding scheme, and the like) for modulating data and retransmission control in the HARQ based on uplink feedback information (a downlink channel feedback information (channel state information (channel quality, the number of streams, precoding information, and the like)), ACK/NACK feedback information for downlink data, or the like) received from the mobile station device 200, information of available downlink PRBs of each mobile station device 200, a buffer situation, scheduling information input from the upper layer 108, and the like. The scheduling information that is used in the downlink scheduling is output to the data control unit 101a.

In uplink scheduling, the scheduling unit 104 performs processing of selection of an uplink transport format (transmission format) (PRB allocation and modulation schemes, a coding scheme, and the like) for modulating data based on an estimation result of an uplink channel state (radio propagation channel state) output by the channel estimation unit 105, a resource allocation request from the mobile station device 200, information of available PRBs of each mobile station device 200, scheduling information input from the upper layer 108, and the like.

The scheduling information that is used in the uplink scheduling is output to the data control unit 101a.

The scheduling unit 104 maps the logical channel of the downlink input from the upper layer 108 to the transport channel, and outputs a mapping result to the data control unit 101a. Also, the scheduling unit 104 processes control data and the transport channel acquired in the uplink input from the data extraction unit 107 if necessary, maps a processing result to the logical channel of the uplink, and outputs a mapping result to the upper layer 108.

The channel estimation unit 105 estimates an uplink channel state from an uplink DRS for uplink data demodulation, and outputs an estimation result to the DFT-S-OFDM demodulation unit 106. Also, to perform the uplink scheduling, the uplink channel state is estimated from an uplink SRS and an estimation result is output to the scheduling unit 104.

An uplink communication scheme is assumed to be a single carrier scheme such as DFT-S-OFDM, but a multi-carrier scheme such as an OFDM scheme may be used.

Based on the uplink channel state estimation result input from the channel estimation unit 105, the DFT-S-OFDM demodulation unit 106 performs demodulation processing by performing DFT-S-OFDM signal processing such as discrete Fourier transform (DFT) conversion, subcarrier mapping, IFFT conversion, filtering, and the like for modulation data input from the radio unit 103a, and outputs a processing result to the data extraction unit 107.

The data extraction unit 107 checks the accuracy of data input from the DFT-S-OFDM demodulation unit 106, and outputs a check result (positive signal ACK/negative signal NACK) to the scheduling unit 104.

Also, the data extraction unit 107 separates the transport channel and the control data of the physical layer from data input from the DFT-S-OFDM demodulation unit 106, and outputs the transport channel and the control data to the scheduling unit 104.

The separated control data includes uplink feedback information (a downlink CFR and ACK/NACK feedback information for downlink data) reported from the mobile station device 200, and the like.

The upper layer 108 performs processing of a packet data convergence protocol (PDCP) layer, a radio link control (RLC) layer, and an RRC layer.

The upper layer 108 has a radio resource control unit 109. The radio resource control unit 109 performs management of various types of setting information, management of system information, paging control, management of a communication state of each mobile station device, mobility management of a handover and the like, management of a buffer situation of each mobile station device, management of connection setup of unicast and multicast bearers, and management of a mobile station identifier (UEID).

FIG. 11 is a schematic block diagram showing a configuration of the mobile station device 200 according to the first embodiment of the present invention. The mobile station device 200 includes a data control unit 201, a DFT-S-OFDM modulation unit 202, a radio unit 203a, a scheduling unit 204, a channel estimation unit 205a, an OFDM demodulation unit 206a, a data extraction unit 207a, an upper layer 208, and an antenna unit A2.

The data control unit 201, the DFT-S-OFDM modulation unit 202, the radio unit 203a, the scheduling unit 204, and the upper layer 208 constitute a transmission unit. The radio unit 203a, the scheduling unit 204, the channel estimation unit 205a, the OFDM demodulation unit 206a, the data extraction unit 207a, and the upper layer 208 constitute a reception unit. The scheduling unit 204 constitutes a selection unit.

The data control unit 201, the DFT-S-OFDM modulation unit 202, and the radio unit 203a perform processing of the physical layer of the uplink. The radio unit 203a, the channel estimation unit 205a, the OFDM demodulation unit 206a, and the data extraction unit 207a perform processing of the physical layer of the downlink.

The data control unit 201 acquires the transport channel and scheduling information from the scheduling unit 204.

The data control unit 201 maps the transport channel and a signal and a channel generated in the physical layer to the physical channel based on the scheduling information input from the scheduling unit 204. The data mapped as described above is output to the DFT-S-OFDM modulation unit 202.

The DFT-S-OFDM modulation unit 202 performs DFT-S-OFDM signal processing such as data modulation, DFT processing, subcarrier mapping, IFFT processing, CP insertion, filtering, and the like for the data input from the data control unit 201, generates a DFT-S-OFDM signal, and outputs the DFT-S-OFDM signal to the radio unit 203a.

An uplink communication scheme is assumed to be a single carrier scheme such as DFT-S-OFDM, but a multi-carrier scheme such as an OFDM scheme may be used in place thereof.

The radio unit 203a generates a radio signal by up-converting modulation data input from the DFT-S-OFDM modulation unit 202 into a radio frequency, and transmits the radio signal to the base station device 100 (FIG. 10) via the antenna unit A2. The radio unit 203a receives a radio signal modulated by downlink data from the base station device 100 via the antenna unit A2, down-converts the radio signal into a baseband signal, and outputs reception data to the channel estimation unit 205a and the OFDM demodulation unit 206a.

The scheduling unit 204 performs processing of the MAC layer. The scheduling unit 204 performs mapping of the logical channel and the transport channel, downlink and uplink scheduling (HARQ processing, transport format selection, and the like), and the like.

In downlink scheduling, the scheduling unit 204 performs reception control of the transport channel, the physical signal, and the physical channel, or HARQ retransmission control based on scheduling information (transport format or HARQ retransmission information) and the like from the base station device 100 or the upper layer 208.

In uplink scheduling, the scheduling unit 204 performs scheduling processing for mapping the logical channel of the uplink input from the upper layer 208 to the transport channel based on a buffer situation of the uplink input from the upper layer 208, uplink scheduling information (transport format or HARQ retransmission information or the like) from the base station device 100 input from the data extraction unit 207a, scheduling information input from the upper layer 208, and the like.

In the uplink transport format, information reported from the base station device 100 is used. The scheduling information is output to the data control unit 201.

The scheduling unit 204 maps the logical channel of the uplink input from the upper layer 208 to the transport channel, and outputs a mapping result to the data control unit 201. The scheduling unit 204 also outputs a downlink CFR (channel state information) input from the channel estimation unit 205a or a CRC check result input from the data extraction unit 207a to the data control unit 201.

Also, the scheduling unit 204 processes the control data and the transport channel acquired in the downlink input from the data extraction unit 207a if necessary, maps a processing result to the logical channel of the downlink, and outputs a mapping result to the upper layer 208.

The channel estimation unit 205a estimates a downlink channel state from a downlink reference signal (RS) for downlink data modulation, and outputs an estimation result to the OFDM demodulation unit 206a.

The channel estimation unit 205a estimates a downlink channel state from the downlink RS so as to notify the base station device 100 of an estimation result of the downlink channel state (radio propagation channel state), converts an estimation result into downlink channel state feedback information (channel quality information and the like), and outputs the downlink channel state feedback information to the scheduling unit 204.

The OFDM demodulation unit 206a performs OFDM demodulation processing for modulation data input from the radio unit 203a based on the downlink channel state estimation result input from the channel estimation unit 205a, and outputs a processing result to the data extraction unit 207a.

The data extraction unit 207a performs CRC for data input from the OFDM demodulation unit 206a, checks accuracy, and outputs a check result (ACK/NACK feedback information) to the scheduling unit 204.

The data extraction unit 207a separates the transport channel and the control data of the physical layer from data input from the OFDM demodulation unit 206a, and outputs the transport channel and the control data to the scheduling unit 204. The separated control data includes scheduling information such as downlink or uplink resource allocation or uplink HARQ control information. At this time, a search space (also referred to as a search region) of the PDCCH is decoded and downlink or uplink resource allocation or the like destined for its own station is extracted.

The upper layer 208 performs processing of the PDCP layer, the RLC layer, and the RRC layer. The upper layer 208 has a radio resource control unit 209.

The radio resource control unit 209 performs management of various types of setting information, management of system information, paging control, management of a communication state of its own station, mobility management of a handover and the like, management of a buffer situation, management of connection setup of unicast and multicast bearers, and management of a mobile station identifier (UEID).

Figure 12:
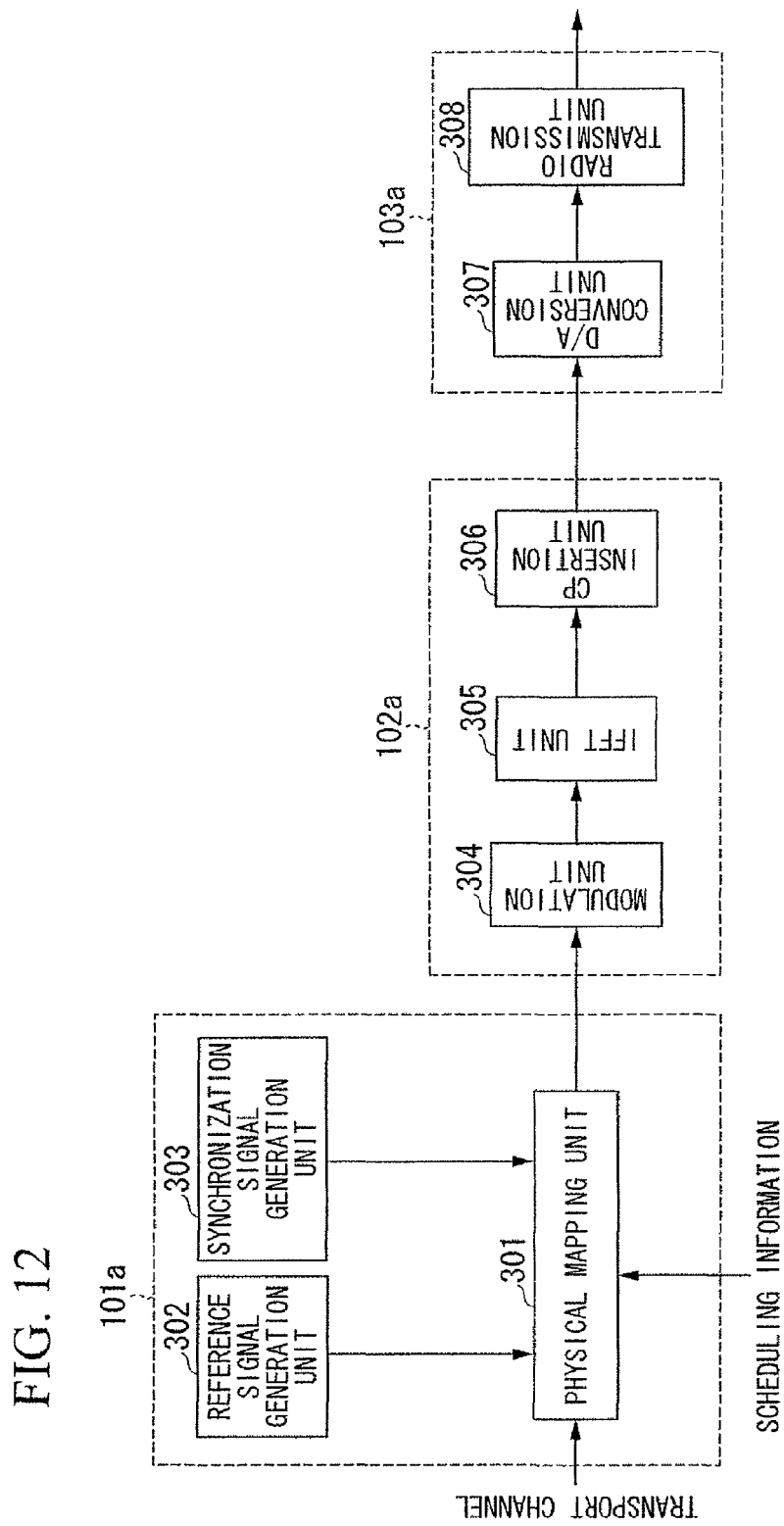
FIG. 12 is a schematic block diagram showing configurations of a data control unit 101a, an OFDM modulation unit 102a, and a radio unit 103a of the base station device 100 (FIG. 10) according to the first embodiment of the present invention.

FIG. 12 is a schematic block diagram showing configurations of the data control unit 101a, the OFDM modulation unit 102a, and the radio unit 103a of the base station device 100 (FIG. 10) according to the first embodiment of the present invention. Here, the case where frequency aggregation is applied to the downlink in the base station device 100 (FIG. 10) will be described.

The data control unit 101a includes a physical mapping unit 301, a reference signal generation unit 302, and a synchronization signal generation unit 303. The reference signal generation unit 302 generates a downlink reference signal and outputs the downlink reference signal to the physical mapping unit 301. The synchronization signal generation unit 303 generates a synchronization signal and outputs the synchronization signal to the physical mapping unit 301.

The physical mapping unit 301 maps the transport channel to PRBs based on the scheduling information, and multiplexes the reference signal generated in the reference signal generation unit 302 and the synchronization signal generated in the synchronization signal generation unit 303 into a physical frame.

At this time, the scheduling information includes information related to a system bandwidth. The physical mapping unit 301 maps the transport channel to PRBs arranged in the band of $N_1 W_{PRB}$ within the system band W1 and PRBs arranged in the band of $N_2 W_{PRB}$ within the system band W2, and inserts a null signal into subcarriers of a band other than the system bands W1 and W2 and a guard band. The physical mapping unit 301 maps the PBCH including information related to the system bandwidth.

The OFDM modulation unit 102a includes a modulation unit 304, an IFFT unit 305, and a CP insertion unit 306.

The modulation unit 304 generates a modulation symbol by modulating information mapped to each resource element of a physical frame based on a modulation scheme of QPSK modulation/16QAM modulation/64QAM modulation, or the like, and outputs the modulation symbol to the IFFT unit 305.

The IFFT unit 305 transforms a frequency domain signal into a time domain signal by performing IFFT for the modulation symbol (a modulation symbol arranged on a plane in the frequency axis and the time axis) generated in the modulation unit 304, and outputs the time domain signal to the CP insertion unit 306.

The CP insertion unit 306 generates an OFDM symbol by inserting a CP into the time domain signal, and outputs the OFDM symbol to the D/A conversion unit 307 of the radio unit 103a.

The radio unit 103a includes a D/A conversion unit 307 and a radio transmission unit 308.

The D/A conversion unit 307 converts an OFDM symbol sequence of an output of the CP insertion unit 306, which is a digital signal, into an analog signal, and outputs the analog signal to the radio transmission unit 308.

The radio transmission unit 308 up-converts the analog signal into a radio frequency with use of a carrier frequency shown in FIG. 4, and transmits the generated signal to the mobile station device 200 (FIG. 11) via the antenna unit A1.

Figure 13:
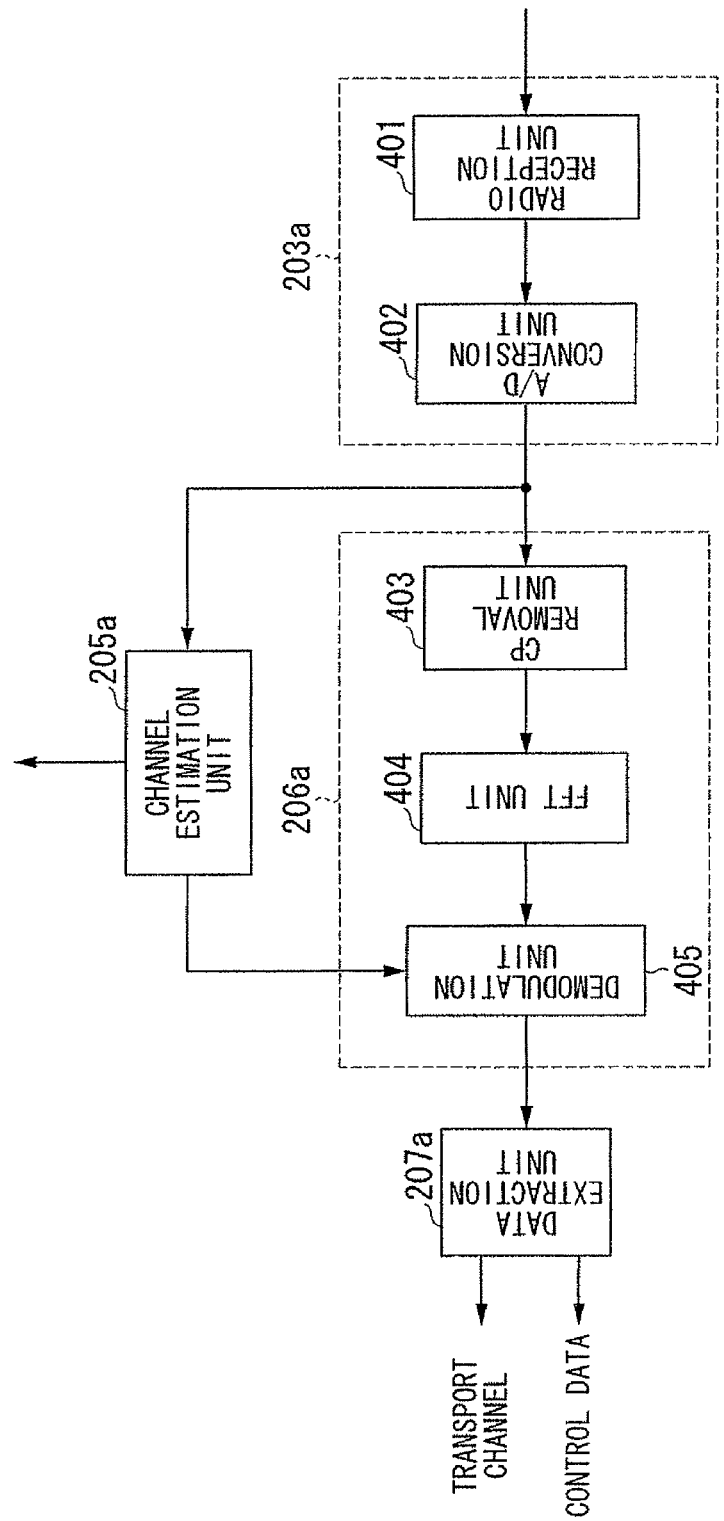
FIG. 13 is a schematic block diagram showing configurations of a radio unit 203a, a channel estimation unit 205a, an OFDM demodulation unit 206a, and a data extraction unit 207a of the mobile station device 200 (FIG. 11) according to the first embodiment of the present invention.

FIG. 13 is a schematic block diagram showing configurations of the radio unit 203a, the channel estimation unit 205a, the OFDM demodulation unit 206a, and the data extraction unit 207a of the mobile station device 200 (FIG. 11) according to the first embodiment of the present invention. Here, the case where frequency aggregation is applied to the downlink in the mobile station device 200 will be described.

The radio unit 203a includes a radio reception unit 401 and an A/D conversion unit 402.

The radio reception unit 401 receives a signal from the base station device 100 (FIG. 10) via the antenna unit A2, and down-converts the received signal into a baseband with use of a carrier frequency shown in FIG. 4. Also, the radio reception unit 401 performs synchronization by referring to a synchronization signal inserted in advance into a signal by cell selection or reselection processing, and sets up a connection in the system bands W1 and W2 with use of information regarding the system bands reported from the scheduling unit 104 or the upper layer. The radio reception unit 401 uses an output of the A/D conversion unit 402 when synchronization is performed using a digital signal.

The A/D conversion unit 402 converts an analog signal of the output of the radio reception unit 401 into a digital signal, and outputs the digital signal to the channel estimation unit 205a and a CP removal unit 403 of the OFDM demodulation unit 206a.

The OFDM demodulation unit 206a includes the CP removal unit 403, an FFT unit 404, and a demodulation unit 405. The CP removal unit 403 removes a CP part from the digital signal output from the A/D conversion unit 402.

A time domain signal from which the CP is removed in the CP removal unit 403 is transformed into a modulation symbol (a modulation symbol arranged on a plane in the frequency axis and the time axis) of each resource element in the FFT unit 404.

The demodulation unit 405 performs demodulation processing, which corresponds to the modulation scheme used in the modulation unit 304, for the modulation symbol into which the transformation is performed while referring to a propagation channel estimation value estimated in the propagation channel estimation unit 205a, and acquires a bit sequence (or bit likelihood information or the like).

If data extraction is set up using information within the PBCH by cell selection or reselection processing, the data extraction unit 207a extracts broadcast information from PRBs of a band including the PBCH, and performs the setup of the data extraction in the system bands W1 and W2.

Alternatively, once the scheduling unit 104 is notified of the broadcast information or the upper layer is notified of the broadcast information via the scheduling unit 104, the data extraction is set up in the system bands W1 and W2 based on instructions thereof. At this time, the scheduling unit 104 or the upper layer notifies the radio reception unit 401 of information regarding the system bands.

If the setup is already made and data is received (normal communication is performed), the data extraction unit 207a maps PRBs to the transport channel. At this time, the data extraction unit 207a removes a signal in subcarriers of a band other than the system bands W1 and W2 and a guard band, and maps PRBs arranged in a band of $N_1 W_{PRB}$ within the system band W1 and PRBs arranged in a band of $N_2 W_{PRB}$ within the system band W2 to the transport channel.

Next, processing of the radio communication system (also referred to as the communication system) according to the first embodiment of the present invention will be described.

In each of the plurality of bands W1 and W2 (FIG. 5(a)) in the first embodiment, a signal is transmitted from the base station device 100 to the mobile station device 200 by assigning data in a natural number of PRBs located in the same frequency axis.

More specifically, the radio unit 103a (also referred to as a signal transmission unit) of the base station device 100 (FIG. 10) transmits a signal in which data is assigned in a natural number of PRBs located in the same frequency axis and a signal including information specifying the plurality of bands W1 and W2 to the mobile station device 200, in each of the plurality of system bands W1 and W2 (FIG. 5(a)). The radio unit 103a may transmit the signal including the information specifying the plurality of bands W1 and W2 to the mobile station device 200 via only any of the plurality of bands W1 and W2.

The radio unit 203a (also referred to as a signal reception unit) of the mobile station device 200 (FIG. 11) receives the signal including the information specifying the plurality of bands W1 and W2 via any of the plurality of bands W1 and W2 from the radio unit 103a of the base station device 100 via the antenna unit A1, and receives the signal in which data is assigned in a natural number of PRBs located in the same frequency axis in each of the plurality of bands W1 and W2 based on the information specifying the plurality of bands W1 and W2, from the radio unit 103a of the base station device 100 via the antenna unit A2.

The signal including the information specifying the plurality of bands W1 and W2 may be inserted into only any of the plurality of bands W1 and W2, and the radio unit 203a may detect and receive the signal including the information specifying the plurality of bands W1 and W2.

The data extraction unit 207a of the mobile station device 200 acquires the signal in which data is assigned in a natural number of PRBs located in the same frequency axis received by the radio unit 203a, via the OFDM demodulation unit 206a, and extracts data transmitted by the base station device 100 from the signal.

In the PRB arrangement according to this embodiment as described above, a natural number of PRBs are arranged on the frequency axis in each of the plurality of bands. After consideration of the arrangement, mapping from the transport channel to PRBs in the base station device 100 and mapping from PRBs to the transport channel in the mobile station device 200 are performed.

Thereby, PRBs can be arranged so that the PRBs do not straddle a plurality of system bands. Thus, a propagation channel characteristic in the inside of the PRB becomes continuous in any PRB and the degradation of accuracy of propagation channel estimation or reception quality measurement can be prevented.

(Second Embodiment)

Next, a radio communication system according to the second embodiment of the present invention will be described. Since configurations of a base station device and a mobile station device according to the second embodiment are the same as those of the base station device 100 and the mobile station device 200 according to the first embodiment, description thereof is omitted. Hereinafter, only parts of the second embodiment different from the first embodiment will be described.

Figure 14:
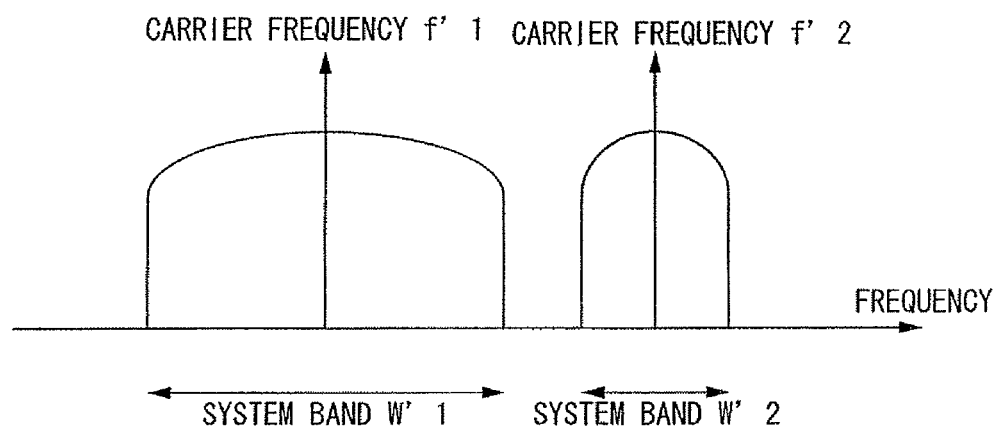
FIG. 14 is a diagram showing an example of bands used in a radio communication system according to a second embodiment of the present invention.

FIG. 14 is a diagram showing an example of bands used in the radio communication system according to the second embodiment of the present invention. In FIG. 4, the horizontal axis represents frequency. In this embodiment, a signal is transmitted from the base station device 100 to the mobile station device 200 with use of frequencies of system bands W'1 and W'2. The carrier frequency of the system band W'1 is f'1 and the carrier frequency of the system band W'2 is f'2.

The base station device 100 may transmit a signal to the mobile station device 200 with use of only one system band. In this case, it is preferable to use the same configuration as that of the base station device 100 of the first embodiment. The same configuration as those shown in FIGS. 5(a) and 5(b) can be used as a subframe configuration according to this embodiment.

A synchronization signal, which is a signal for synchronization, and the PBCH, which is a channel including physical broadcast information, are inserted into any one (herein, the system band W'1) of the system bands.

The mobile station device 200 performs frame synchronization by searching for the synchronization signal, and also acquires information within the PBCH. Information within the PBCH includes information indicating the system band (information regarding an aggregation resource region including the system band W'2). Using the information, the mobile station device 200 receives the system bands W'1 and W'2.

At this time, $N_1$ PRBs are arranged in the system band W'1 and $N_2$ PRBs are arranged in the system band W'2. Thereby, a propagation channel characteristic in the inside of the PRB becomes continuous in any PRB and the degradation of accuracy of propagation channel estimation or reception quality measurement can be prevented.

Figure 15:
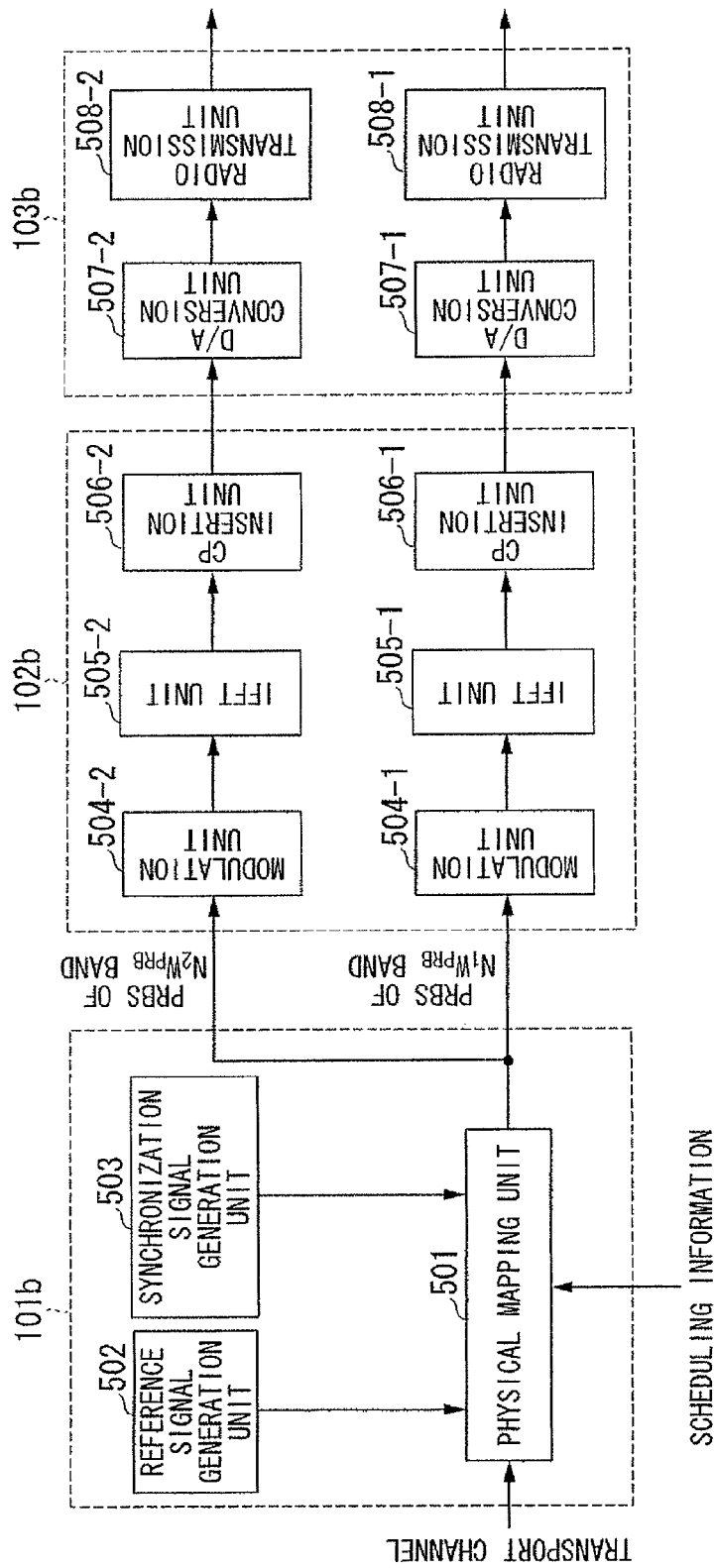
FIG. 15 is a schematic block diagram showing configurations of a data control unit 101b, an OFDM modulation unit 102b, and a radio unit 103b of a base station device according to the second embodiment of the present invention.

FIG. 15 is a schematic block diagram showing configurations of a data control unit 101b, an OFDM modulation unit 102b, and a radio unit 103b of the base station device according to the second embodiment of the present invention. Here, the case where frequency aggregation is applied to the downlink in the base station device will be described.

The base station device according to the second embodiment includes the data control unit 101b, the OFDM modulation unit 102b, and the radio unit 103b in place of the data control unit 101a, the OFDM modulation unit 102a, and the radio unit 103a (FIG. 12) of the base station device 100 according to the first embodiment.

The data control unit 101b includes a physical mapping unit 501, a reference signal generation unit 502, and a synchronization signal generation unit 503.

The reference signal generation unit 502 generates a downlink reference signal and outputs the downlink reference signal to the physical mapping unit 5011. The synchronization signal generation unit 503 generates a synchronization signal and outputs the synchronization signal to the physical mapping unit 5011. The physical mapping unit 501 maps the transport channel to PRBs based on scheduling information, and also multiplexes the reference signal generated in the reference signal generation unit 502 and the synchronization signal generated in the synchronization signal generation unit 503 into a physical frame.

At this time, information related to system bandwidths W'1 and W'2 is included in the scheduling information. The physical mapping unit 501 maps the transport channel to PRBs arranged in a band of $N_1 W_{PRB}$ within the system band W'1 and PRBs arranged in a band of $N_2 W_{PRB}$ within the system band W'2.

The OFDM modulation unit 102b includes modulation units 504-1 and 504-2, IFFT units 505-1 and 505-2, and CP insertion units 506-1 and 506-2.

The modulation unit 504-1, the IFFT unit 505-1, and the CP insertion unit 506-1 process the PRBs arranged in the band of $N_1 W_{PRB}$ within the system band W'1.

The modulation unit 504-1 generates a modulation symbol by modulating information mapped to each resource element of a physical frame based on a modulation scheme of QPSK modulation, 16QAM modulation, 64QAM modulation, or the like, and outputs the modulation symbol to the IFFT unit 505-1.

The IFFT unit 505-1 transforms a frequency domain signal into a time domain signal by performing IFFT for the modulation symbol (a modulation symbol arranged on a plane in the frequency axis and the time axis) generated in the modulation unit 504-1, and outputs the time domain signal to the CP insertion unit 506-1.

The CP insertion unit 506-1 generates an OFDM symbol by inserting a CP into the time domain signal, and outputs the OFDM symbol to a D/A conversion unit 507-1 of the radio unit 103b.

The modulation unit 504-2, the IFFT unit 505-2, and the CP insertion unit 506-2 process the PRBs arranged in the band of $N_2 W_{PRB}$ within the system band W'2.

The modulation unit 504-2 generates a modulation symbol by modulating information mapped to each resource element of a physical frame based on a modulation scheme of QPSK modulation, 16QAM modulation, 64QAM modulation, or the like, and outputs the modulation symbol to the IFFT unit 505-2.

The IFFT unit 505-2 transforms a frequency domain signal into a time domain signal by performing IFFT for the modulation symbol (a modulation symbol arranged on a plane in the frequency axis and the time axis) generated in the modulation unit 504-2, and outputs the time domain signal to the CP insertion unit 506-2.

The CP insertion unit 506-2 generates an OFDM symbol by inserting a CP into the time domain signal, and outputs the OFDM symbol to a D/A conversion unit 507-2 of the radio unit 103b.

The radio unit 103b includes the D/A conversion units 507-1 and 507-2 and radio transmission units 508-1 and 508-2.

The D/A conversion unit 507-1 and the radio transmission unit 508-1 process the PRBs arranged in the band of $N_1 W_{PRB}$ within the system band W'1.

The D/A conversion unit 507-1 converts an OFDM symbol sequence of an output of the CP insertion unit 506-1, which is a digital signal, into an analog signal, and outputs the analog signal to the radio transmission unit 508-1.

The radio transmission unit 508-1 up-converts the analog signal into a radio frequency with use of a carrier frequency W'1 shown in FIG. 14, and transmits the generated signal to the mobile station device via the antenna unit A1.

The D/A conversion unit 507-2 and the radio transmission unit 508-2 process the PRBs arranged in the band of $N_2 W_{PRB}$ within the system band W'2.

The D/A conversion unit 507-2 converts an OFDM symbol sequence of an output of the CP insertion unit 506-2, which is a digital signal, into an analog signal, and outputs the analog signal to the radio transmission unit 508-2.

The radio transmission unit 508-2 up-converts the analog signal into a radio frequency with use of a carrier frequency W'2 shown in FIG. 14, and transmits the generated signal to the mobile station device via the antenna unit A1.

Here, blocks divided to perform the same processing for different signals have been described, but one circuit may be shared.

Figure 16:
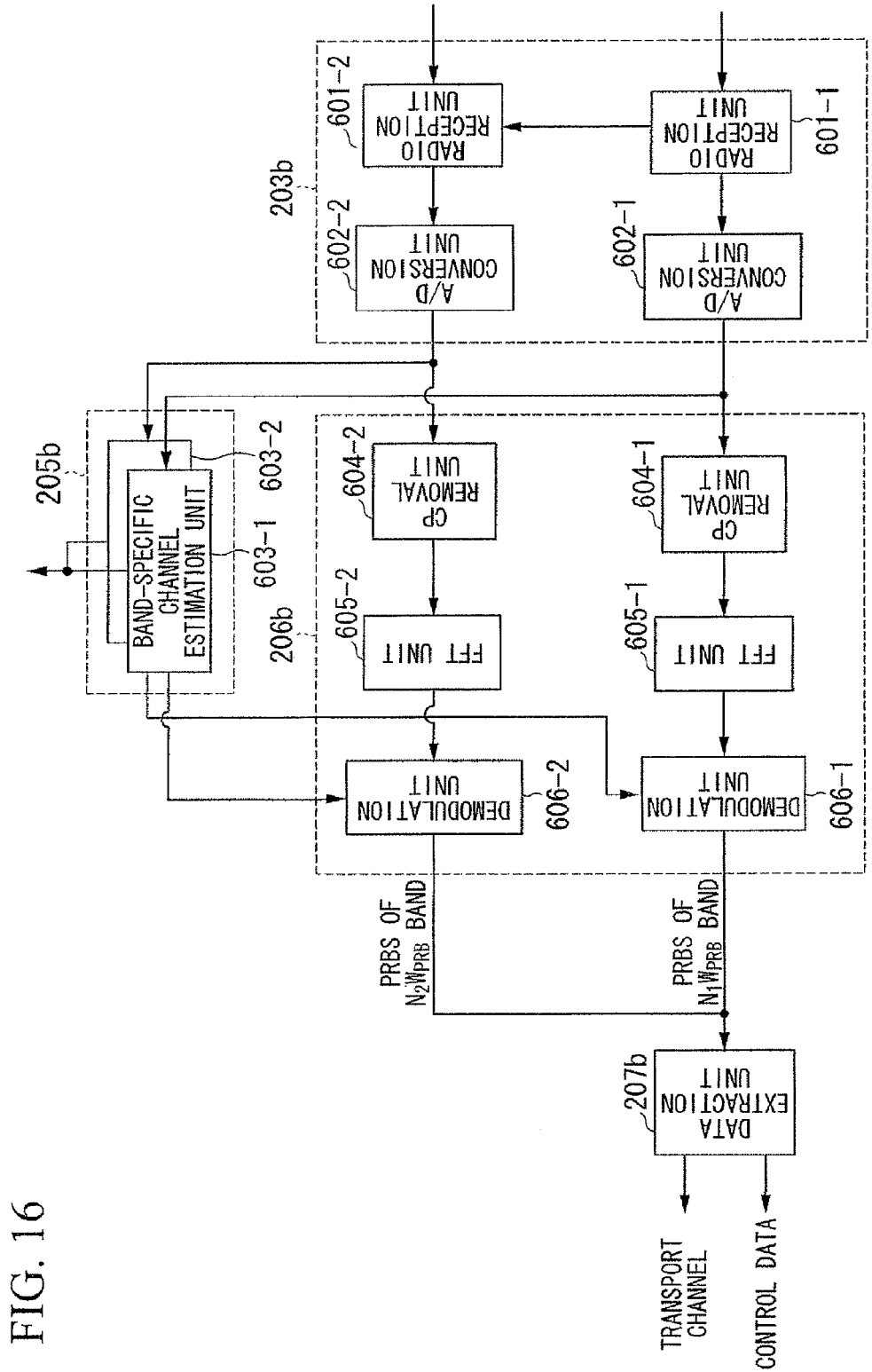
FIG. 16 is a schematic block diagram showing configurations of a radio unit 203b, a channel estimation unit 205b, an OFDM demodulation unit 206b, and a data extraction unit 207b of a mobile station device according to the second embodiment of the present invention.

FIG. 16 is a schematic block diagram showing configurations of a radio unit 203b, a channel estimation unit 205b, an OFDM demodulation unit 206b, and a data extraction unit 207b of the mobile station device 200 according to the second embodiment of the present invention. Here, the case where frequency aggregation is applied to the downlink in the mobile station device 200 will be described.

The mobile station device 200 according to the second embodiment includes the radio unit 203b, the channel estimation unit 205b, the OFDM demodulation unit 206b, and the data extraction unit 207b in place of the radio unit 203a, the channel estimation unit 205a, the OFDM demodulation unit 206a, and the data extraction unit 207a (FIG. 13) of the mobile station device 200 according to the first embodiment.

The radio unit 203b includes radio reception units 601-1 and 601-2 and A/D conversion units 602-1 and 602-2.

The radio reception unit 601-1 receives a signal from the base station device 100 via the antenna unit A2, and down-converts the received signal into a baseband with use of the carrier frequency W'1 shown in FIG. 14. Also, the radio reception unit 601-1 performs synchronization by referring to a synchronization signal inserted in advance into a signal by cell selection or reselection processing, and sets up a connection in the system band W'1 with use of information regarding the system band reported from the scheduling unit 104 or the upper layer. The radio reception unit 601-1 uses an output of the A/D conversion unit 602-1 described below when the synchronization is performed using a digital signal.

The A/D conversion unit 602-1 converts an analog signal of an output of the radio reception unit 601-1 into a digital signal, and outputs the digital signal to a band-specific channel estimation unit 603-1 of the channel estimation unit 205b and a CP removal unit 604-1 of the OFDM demodulation unit 206b.

The radio reception unit 601-2 sets up a connection in the system band W'2 with use of information regarding the system band reported from the scheduling unit 104 or the upper layer, receives a signal from the base station device via the antenna unit A2, down-converts the received signal into a baseband with use of the carrier frequency W'2 shown in FIG. 14 based on timing of frame synchronization performed in the radio reception unit 601-1, and outputs the down-converted signal to the A/D conversion unit 602-2.

The A/D conversion unit 602-2 converts an analog signal of an output of the radio reception unit 601-2 into a digital signal, and outputs the digital signal to a band-specific channel estimation unit 603-2 of the channel estimation unit 205*b* and a CP removal unit 604-2 of the OFDM demodulation unit 206*b*.

The channel estimation unit 205*b* includes the band-specific channel estimation units 603-1 and 603-2.

The band-specific channel estimation unit 603-1 performs channel estimation in the PRBs arranged in the band of $N_1 W_{PRB}$ by referring to a reference signal in the PRBs arranged in the band of $N_1 W_{PRB}$ in the system band W'1, and outputs an estimation result to a demodulation unit 606-1 of the OFDM demodulation unit 206*b*.

The band-specific channel estimation unit 603-2 performs channel estimation in the PRBs arranged in the band of $N_2 W_{PRB}$ by referring to a reference signal in the PRBs arranged in the band of $N_2 W_{PRB}$ in the system band W'2, and outputs an estimation result to a demodulation unit 606-2 of the OFDM demodulation unit 206*b*.

The OFDM demodulation unit 206*b* includes the CP removal units 604-1 and 604-2, FFT units 605-1 and 605-2, and the demodulation units 606-1 and 606-2.

The CP removal unit 604-1, the FFT unit 605-1, and the demodulation unit 606-1 process the PRBs arranged in the band of $N_1 W_{PRB}$ in the system band W'1.

The CP removal unit 604-1 removes a CP part from the digital signal output from the A/D conversion unit 602-1.

A time domain signal from which a CP is removed in the CP removal unit 604-1 is transformed into a modulation symbol (a modulation symbol arranged on a plane in the frequency axis (the band of $N_1 W_{PRB}$) and the time axis) of each resource element in the FFT unit 605-1, and the modulation symbol is output to the FFT unit 605-1.

The demodulation unit 606-1 performs demodulation processing, which corresponds to the modulation scheme used in the modulation unit 504-1, for the modulation symbol into which the transformation is performed while referring to a propagation channel estimation value estimated in the propagation channel estimation unit 603-1, and acquires a bit sequence (or bit likelihood information or the like).

The CP removal unit 604-2, the FFT unit 605-2, and the demodulation unit 606-2 process the PRBs arranged in the band of $N_2 W_{PRB}$ in the system band W'2.

The CP removal unit 604-2 removes a CP part from the digital signal output from the A/D conversion unit 602-2, and outputs a removal result to the FFT unit 605-2.

A time domain signal from which a CP is removed in the CP removal unit 604-2 is transformed into a modulation symbol (a modulation symbol arranged on a plane in the frequency axis (the band of $N_2 W_{PRB}$) and the time axis) of each resource element in the FFT unit 605-2, and the modulation symbol is output to the demodulation unit 606-2.

The demodulation unit 606-2 performs demodulation processing, which corresponds to the modulation scheme used in the modulation unit 504-2, for the modulation symbol into which the transformation is performed while referring to a propagation channel estimation value estimated in the propagation channel estimation unit 603-2, and acquires a bit sequence (or bit likelihood information or the like).

If data extraction is set up using information within the PBCH by cell selection or reselection processing, the data extraction unit 207 extracts broadcast information from PRBs of a band including the PBCH, and sets up the data extraction in the system bands W'1 and W'2.

Alternatively, once the scheduling unit 104 is notified of the broadcast information or the upper layer is notified of the broadcast information via the scheduling unit 104, the data extraction is set in the system bands W'1 and W'2 based on instructions thereof. At this time, the scheduling unit 104 or the upper layer notifies the radio reception units 601-1 and 601-2 of information regarding the system bands.

If the setup is already made and data is received (normal communication is performed), the data extraction unit 207*b* maps PRBs to the transport channel based on the scheduling information. At this time, the data extraction unit 207*b* maps PRBs arranged in the band of $N_1 W_{PRB}$ within the system band W'1, which is an output of the demodulation unit 606-1, and PRBs arranged in the band of $N_2 W_{PRB}$ within the system band W'2, which is an output of the demodulation unit 606-2, to the transport channel.

Here, blocks divided to perform the same processing for different signals have been described, but one circuit may be shared.

Figure 5:
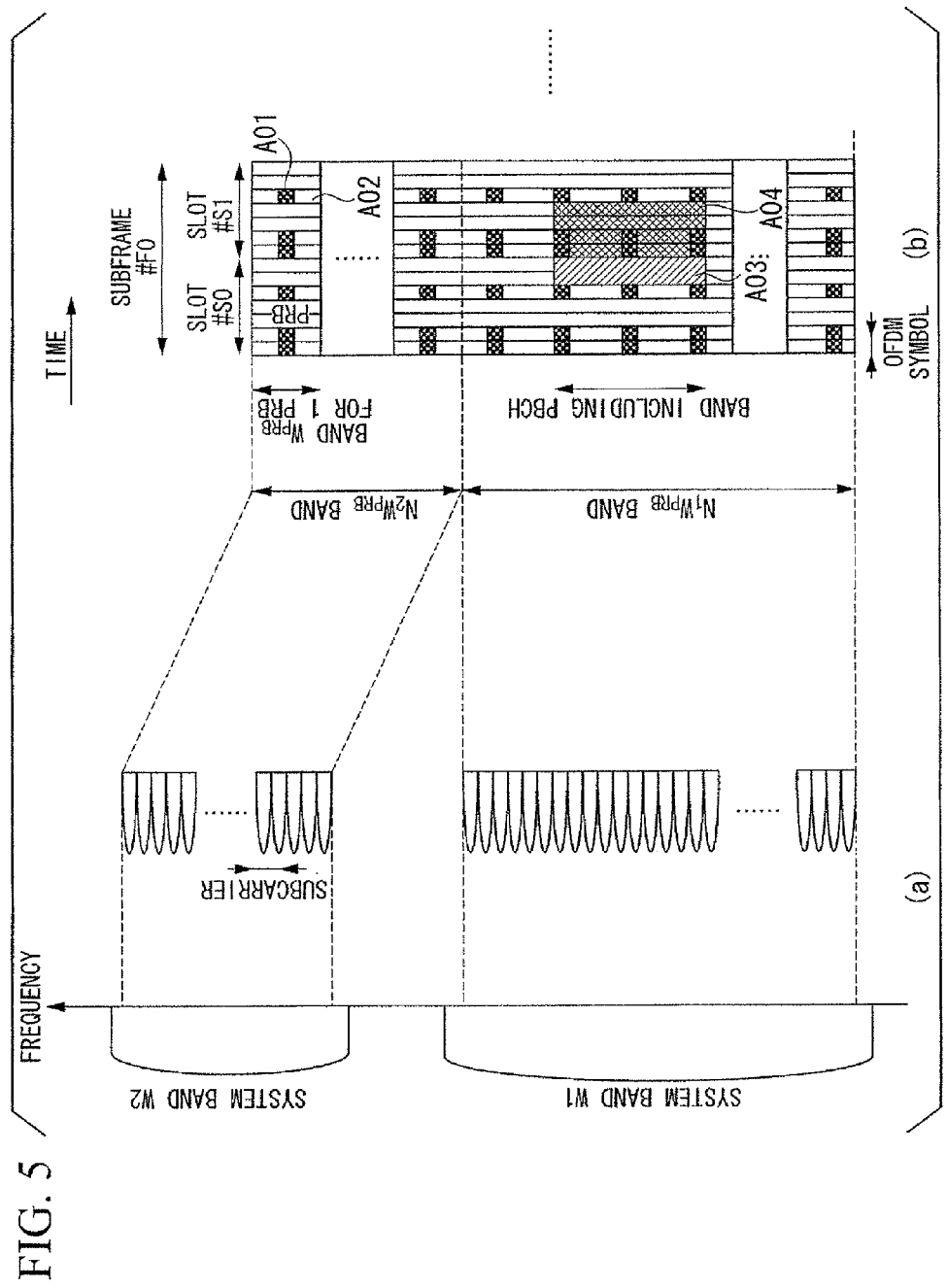
FIG. 5 is a diagram showing an example of a subframe configuration used in the first embodiment of the present invention.

The frame configuration as shown in FIGS. 5(*a*) and 5(*b*) has been described above, but a frame configuration as shown in FIGS. 17(*a*) and 17(*b*) may be used.

Figure 17:
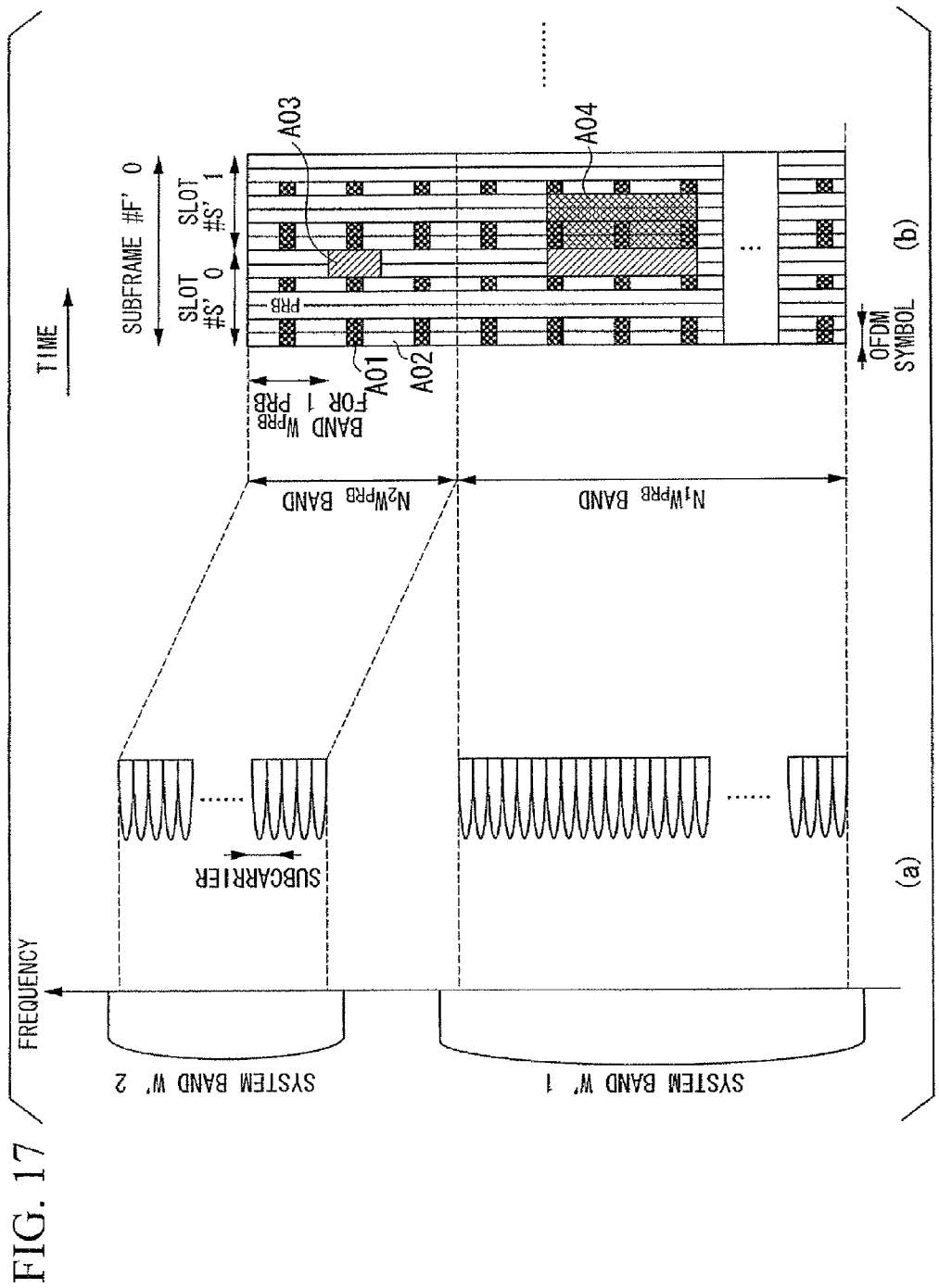
FIG. 17 is a diagram showing another example of a subframe configuration used in the second embodiment of the present invention.

FIGS. 17(*a*) and 17(*b*) are diagrams showing another example of a subframe configuration used in the second embodiment of the present invention. In FIG. 17(*a*), the vertical axis represents frequency. In FIG. 17(*b*), the horizontal axis represents time and the vertical axis represents frequency.

As shown in FIG. 17(*a*), if the base station device 100 communicates with the mobile station device 200 in this embodiment, a plurality of bands (here, system bands W'1 and W'2) are used. A plurality of subcarriers are included in each of the system bands W'1 and W'2.

As shown in FIG. 17(*b*), a subframe #F'0 includes a slot #S'0 and a slot #S'1. Each of the slot #S'0 and the slot #S'1 includes 7 OFDM symbols.

A band of $N_2 W_{PRB}$ corresponding to the system band W'2 includes $N_2$ PRB bands $W_{PRB}$. In the band of $N_2 W_{PRB}$, a downlink reference signal A01, a physical downlink channel A02 and a physical downlink synchronization signal A03 are arranged.

A band of $N_1 W_{PRB}$ corresponding to the system band W'1 includes $N_1$ PRB bands $W_{PRB}$. In the band of $N_1 W_{PRB}$, the downlink reference signal A01, the physical downlink channel A02, the physical downlink synchronization signal A03, and a PBCH A04 are arranged.

Even when a frame of the configuration of FIGS. 17(*a*) and 17(*b*) is used, the same configuration as that of the base station device 100 or the mobile station device 200 described above can be used. In this case, the radio reception units 601-1 and 601-2 respectively perform frame synchronization using a synchronization signal of the system band W'1 and a synchronization signal of the system band W'2. Thus, the timing of frame synchronization may not be reported from the radio reception unit 601-1 to the radio reception unit 601-2.

Further, if the synchronization signal and the PBCH are arranged in the two system bands, it is preferable to perform the setup of synchronization/broadcast information acquisition/system band reception in each of the system bands. Even in this case, processing of the data extraction unit 207*b* is the same as the above-described processing.

In the PRB arrangement according to this embodiment as described above, a natural number of PRBs are arranged on the frequency axis in each of the plurality of bands. After consideration of the arrangement, mapping from the transport channel to PRBs in the base station device 100 and mapping from PRBs to the transport channel in the mobile station device 200 are performed.

Thereby, PRBs can be arranged so that the PRBs do not straddle a plurality of system bands. Thus, a propagation channel characteristic in the inside of the PRB becomes continuous in any PRB and the degradation of accuracy of propagation channel estimation or reception quality measurement can be prevented.

(Third Embodiment)

Next, a communication system according to the third embodiment of the present invention will be described. Since configurations of a base station device and a mobile station device according to the third embodiment are the same as those of the base station device 100 and the mobile station device 200 according to the first embodiment, description thereof is omitted. Hereinafter, only parts of the third embodiment different from the first embodiment will be described.

In this embodiment, the case where a subband unit in which a band of a plurality of resource blocks is arranged in the frequency axis is used as a measurement unit of reception quality or a reference unit of reception quality will be described.

Figure 18:
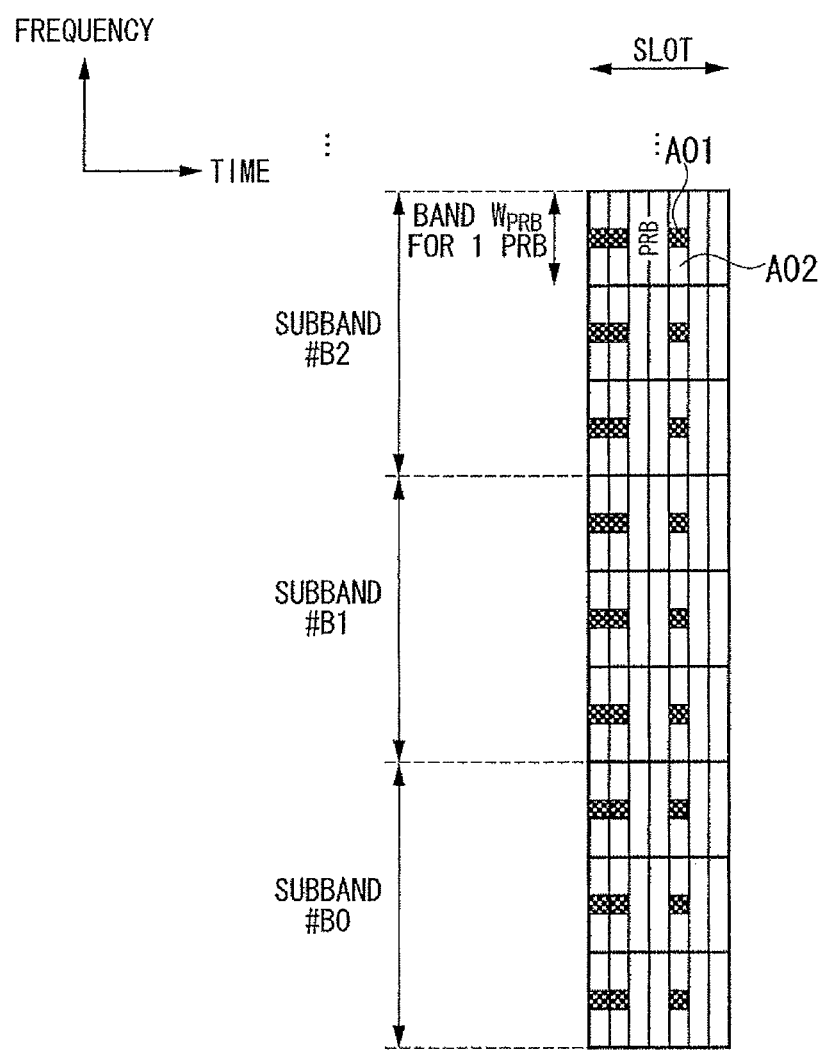
FIG. 18 is a diagram showing an example of subbands used in a communication system according to a third embodiment of the present invention.

FIG. 18 is a diagram showing an example of subbands used in the communication system according to the third embodiment of the present invention. In FIG. 18, the horizontal axis represents time and the vertical axis represents frequency.

In FIG. 18, subbands #B0, #B1, #B2, . . . respectively include 3 PRBs in the frequency axis. The subbands #B0, #B1, #B2, . . . respectively include 1 slot.

In PRBs constituting the subbands #B0, #B1, #B2, . . . , a downlink reference signal A01 and a physical downlink channel A02 are arranged.

The case where a plurality of subbands are the same band has been described here, but the present invention is not limited thereto.

Figure 19:
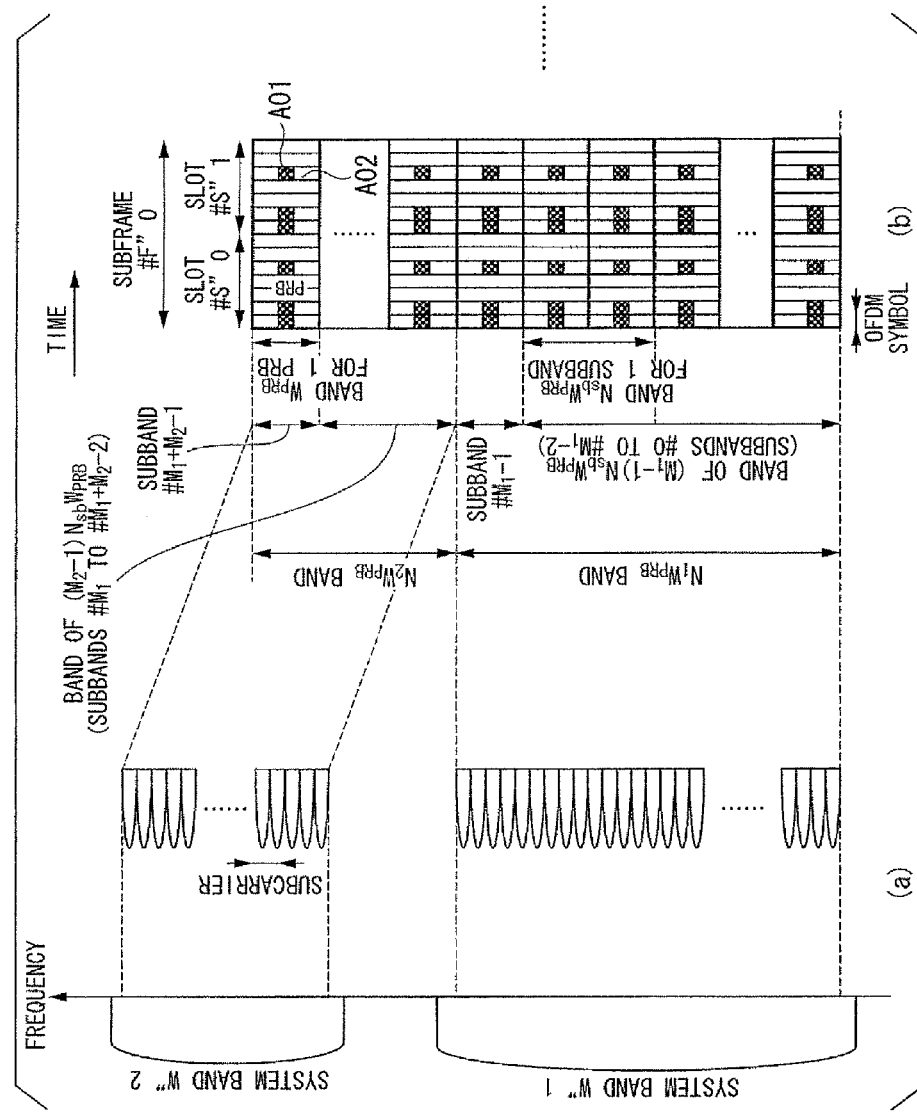
FIG. 19 is a diagram showing an example of a subframe configuration used in the third embodiment of the present invention.

FIGS. 19(*a*) and 19(*b*) are diagrams showing another example of a subframe configuration used in the third embodiment of the present invention. In FIG. 19(*a*), the vertical axis represents frequency. In FIG. 19(*b*), the horizontal axis represents time and the vertical axis represents frequency.

As shown in FIG. 19(*a*), if the base station device 100 communicates with the mobile station device 200 in this embodiment, a plurality of bands (here, system bands W"1 and W"2) are used. A plurality of subcarriers are included in each of the system bands W"1 and W"2.

As shown in FIG. 19(*b*), a subframe #F"0 has a time width of 1 millisecond (ms). The subframe #F"0 includes a slot #S"0 and a slot #S"1. Each of the slot #S"0 and the slot #S"1 includes 7 OFDM symbols.

A band of $N_2 W_{PRB}$ corresponding to the system band W"2 includes $N_2$ PRB bands $W_{PRB}$. In the band of $N_2 W_{PRB}$, a downlink reference signal A01 and a physical downlink channel A02 are arranged.

A band of $N_1 W_{PRB}$ corresponding to the system band W"1 includes $N_1$ PRB bands $W_{PRB}$. In the band of $N_1 W_{PRB}$, the downlink reference signal A01 and the physical downlink channel A02 are arranged.

FIG. 19(*b*) shows an example of a configuration of a subframe, which is a transmission unit of OFDM that is a type of multicarrier communication scheme. A band of a plurality of resource blocks in the frequency axis is referred to as a subband. Hereinafter, the case where each PRB has a uniform bandwidth $W_{PRB}$ in the frequency axis will be described.

When one broadband system is operated by compositely using a plurality of discontinuous bands W21 and W22 as shown in FIG. 25, a natural number of PRBs are arranged in each of the plurality of bands on the frequency axis. In a subband arrangement, a natural number of subbands are arranged in each of the plurality of bands.

FIGS. 19(*a*) and 19(*b*) show the case where the system uses two bands of the system band W"1 and the system band W"2. $N_1$ ($N_1$ is a natural number) PRBs are set to be arranged in the system band W"1, and $N_2$ ($N_2$ is a natural number) PRBs are set to be arranged in the system band W"2. $M_1$ ($M_1$ is a natural number) subbands are set to be arranged in the system band W"1, and $M_2$ ($M_2$ is a natural number) subbands are set to be arranged in the system band W"2.

For example, the bandwidth of one of the two system bands allowed for the system is W"1 and the bandwidth of the other system band is W"2. In a system in which $W_{PRB}$ is set to a fixed value, $N_1$ is set to a natural number that is less than or equal to ($W"1/W_{PRB}$), and $N_2$ is set to a natural number that is less than or equal to ($W"2/W_{PRB}$). The $M_1$ subbands are constituted by a plurality of groups each including $N_1$ PRBs arranged in the frequency axis within W"1. The $M_2$ subbands are constituted by a plurality of groups each including $N_2$ PRBs arranged in the frequency axis within W"2. Thereby, the system bands are used so that PRBs are arranged in a band of $N_1 W_{PPB}$ within the W"1 band, PRBs are arranged in a band of $N_2 W_{PRB}$ within the W"2 band, the band of $N_1 W_{PRB}$ is divided into the $M_1$ subbands, and the band of $W_2$ is divided into the $M_2$ subbands.

Alternatively, in a system in which $W_{PRB}$ is a parameter capable of being set for each base station device (or each region), $W_{PRB}$ is set as $W"1/N_1$ using a predetermined natural number $N_1$ or is set as $W"2/N_2$ using a predetermined natural number $N_2$. The $M_1$ subbands are constituted by a plurality of groups each including $N_1$ PRBs arranged in the frequency axis within W"1. The $M_2$ subbands are constituted by a plurality of groups each including $N_2$ PRBs arranged in the frequency axis within W"2.

Here, W"1 and W"2 are use bandwidths considering guard bands.

Alternatively, a subband arrangement method (a subband size and the number of subbands (for example, a set of subbands, SetS, of an individual system band)) for the total number of PRBs in the frequency axis within an individual system band is predefined, and the arrangement method is individually applied to a plurality of system bands.

Figure 21:
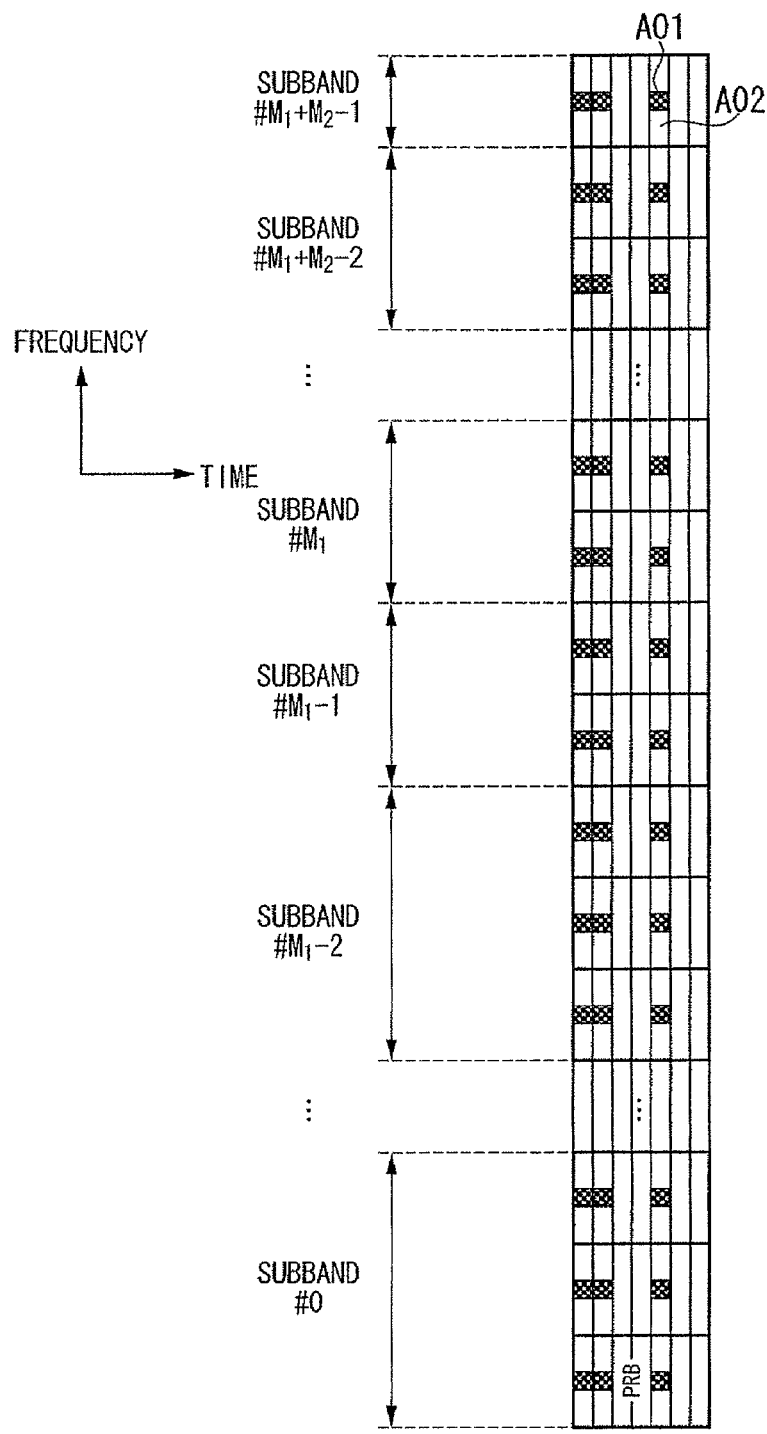
FIG. 21 is a diagram showing an example of a subband arrangement method used by a radio communication system according to the third embodiment of the present invention.

For example, the subband arrangement method shown in FIG. 20 is defined. In FIG. 20, when the number of RBs, $N^i_{PRB}$, of the frequency axis within an individual system bandwidth (system band i) is 4 to 10, a subband size $M^i_{SB}$ is 1 RB in the frequency axis and the number of subbands is ceil[$N^i_{PRB}/M^i_{SB}$] (ceil[*] is a ceiling function and indicates a smallest integer greater than or equal to *), that is, 4 to 10. Likewise, when the number of RBs, $N^i_{PRB}$, in the frequency axis is 11 to 20 and 21 to 30, the subband size $M^i_{SB}$ is respectively 2 RBs and 3 RBs in the frequency axis and the number of subbands is respectively ceil[$N^i_{PRB}/M^i_{SB}$], that is, 6 to 10 and 7 to 10. In this regard, when $N^i_{PRB}$ is not a multiple of $M^i_{SB}$, a size of a ceil[$N^i_{PRB}/M^i_{SB}$]$^{th}$ subband of system band i becomes $N^i_{PRB}-($ceil[$N^i_{PRB}/M^i_{SB}$]$-1) \times M^i_{SB}$. In other words, when the total number of PRBs in the frequency axis within the system band is $N_1$, $M_1-1$ subbands each serving as a band in which 3 PRBs are arranged in the frequency axis are arranged and 1 subband serving as a band in which 2 (a remainder obtained by dividing $N_1$ by 3) PRBs are arranged in the frequency axis is arranged. When the total number of PRBs of the frequency axis within the system band is $N_2$, an arrangement method is defined in which $M_2-1$ subbands each serving as a band in which 2 PRBs are arranged in the frequency axis are arranged and 1 subband serving as a band in which 1 (a remainder obtained by dividing $N_2$ by 2) PRB is arranged in the frequency axis is arranged. As shown in FIG. 21, the arrangement method is individually applied to the system bands W"1 and W"2.

FIG. 21 is a diagram showing an example of a subband arrangement method used in the radio communication system according to the third embodiment of the present invention. In FIG. 21, the horizontal axis represents time and the vertical axis represents frequency. In FIG. 21, a downlink reference signal A01 and a physical downlink channel A02 are arranged in each of subbands #0, . . . , #$M_1$-1, #$M_1$-2, #$M_1$, #$M_1$+$M_2$-2, and #$M_1$+$M_2$-1 in the frequency axis.

The subband size, the number of subbands, SetS, or the like is uniquely preset for the total number of PRBs in the frequency axis within an individual system band. Information regarding SetS for each system band is reported from the base station device 100 to the mobile station device 200 by individually applying the arrangement method to a plurality of system bands. Thereby, the mobile station device 200 can know a subband arrangement of each system band.

As another example, there is a method in which a subband size is uniquely preset for SetS. For example, the subband arrangement method is defined as shown in FIG. 22. In FIG. 22, when the number of RBs, $N^{all}_{PRB}$, in the frequency axis within all system bandwidths is 4 to 10, the subband size $M^{all}_{SB}$ is 1 RB in the frequency axis in all system bands. Likewise, when the number of RBs, $N^{all}_{PRB}$, in the frequency axis is 11 to 20, 21 to 30, and 31 to 40, the subband size $M^{all}_{SB}$ is respectively 2 RBs, 3 RBs, and 4 RBs in the frequency axis. At this time, the number of subbands of an individual system band (system band i) is $\text{ceil}[N^i_{PRB}/M^{all}_{SB}]$.

In this regard, when $N^i_{PRB}$ is not a multiple of $M^{all}_{SB}$, a size of a $\text{ceil}[N^i_{PRB}/M^{all}_{SB}]^{th}$ subband of system band i becomes $N^i_{PRB}-(\text{ceil}[N^i_{PRB}/M^{all}_{SB}]-1) \times M^{all}_{SB}$.

Four examples have been described above, but the present invention is not limited thereto. Other methods using a plurality of system bands may be used in a PRB arrangement and a subband arrangement in which subcarriers within a plurality of different system bands do not exist in 1 PRB and 1 subband.

Next, processing of the radio communication system according to the third embodiment of the present invention will be described.

First, the radio unit 103a (also referred to as a signal transmission unit) of the base station device 100 (FIG. 10) transmits a signal in which data is assigned in a natural number of subbands located in the same frequency axis in each of the plurality of system bands W"1 and W"2 (FIG. 19(a)) and a signal including information specifying the plurality of bands W"1 and W"2 to the mobile station device 200. The radio unit 103a may transmit the signal including the information specifying the plurality of bands W1 and W2 to the mobile station device 200 via only any of the plurality of bands W1 and W2.

The radio unit 203a (also referred to as a signal reception unit) of the mobile station device 200 (FIG. 11) receives the signal including the information specifying the plurality of bands W"1 and W"2 via any of the plurality of bands W"1 and W"2 from the radio unit 103a of the base station device 100 via the antenna unit A1, and receives the signal in which data is assigned in a natural number of subbands located in the same frequency axis in each of the plurality of bands W"1 and W"2 based on the information specifying the plurality of bands W"1 and W"2, from the radio unit 103a of the base station device 100 via the antenna unit A2.

The signal including the information specifying the plurality of bands W"1 and W"2 may be inserted into only any of the plurality of bands W"1 and W"2, and the radio unit 203a may detect and receive the signal including the information specifying the plurality of bands W"1 and W"2.

The data extraction unit 207a of the mobile station device 200 acquires the signal in which data is assigned in a natural number of subbands located in the same frequency axis received by the radio unit 203a, via the OFDM demodulation unit 206a, and extracts data transmitted by the base station device 100 from the signal. The channel estimation unit 205a (FIG. 11) of the mobile station device 200 estimates channel quality of a natural number of subbands in each of a plurality of bands W"1 based on a signal received by the radio unit 203a.

As described with reference to FIG. 21, the radio unit 103a of the base station device 100 may determine a subband bandwidth in each of the plurality of bands W"1 and W"2 in response to the natural number of resource blocks located in the same frequency axis. In response to the natural number of resource blocks located in the same frequency axis, the number of subbands in each of the plurality of bands W"1 and W"2 may be determined.

In this embodiment, subbands are arranged so that the subbands do not straddle a plurality of system bands. Thus, a propagation channel characteristic in the inside of the subband becomes continuous in any subband. In a system in which adaptive scheduling or transmission parameter setting is performed by referring to a reception quality measurement result (or an indicator related to reception quality such as a transmission rate or the like satisfying required communication quality) for each subband, the mobile station device 200 processes the reception quality measurement result for each subband with use of a reference signal and feeds back the processed measurement result to the base station device 100, so that scheduling/transmission parameter setting corresponding to propagation channel characteristics is realized.

At this time, the accuracy of subband reception quality is significantly affected by the variance (variation) of propagation channel characteristics within the subbands. That is, when the variance increases, a difference between reception quality of each resource element within the physical channel and the subband reception quality increases. Since the variance of propagation channel characteristics increases if the propagation channel characteristics within the subbands are discontinuous, the accuracy of reception quality measurement is rapidly degraded. However, in the embodiment of the present invention, subbands are arranged so that the subbands do not straddle a plurality of system bands. Thus, since a propagation channel characteristic in the inside of the subband becomes continuous in any subband and the variance is relatively small, the accuracy of the reception quality measurement result can be retained.

The case where the number of system bands is 2 has been described above in the first to third embodiments, but the present invention is not limited thereto. Each embodiment can be applied to one broadband system compositely using a plurality of discontinuous bands. Here, the plurality of discontinuous bands also include a system band in which a guard band is interposed therebetween.

An example in which the base station device corresponds in one-to-one relation to the mobile station device has been described for convenience of description in the above-described embodiments, but a plurality of base station devices 100 and mobile station devices 200 may be provided. The mobile station device 200 is not limited to a mobile terminal, and may be realized by embedding a function of the mobile station device 200 in the base station device 100 or a fixed terminal.

In the above-described embodiments, a program for implementing functions within the base station device or functions of the mobile station device may be recorded on a computer readable recording medium. The base station device or the mobile station device may be controlled by enabling a computer system to read and execute the program recorded on the recording medium. The "computer system" used herein includes an OS and hardware, such as peripheral devices.

The "computer readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a communication system, a mobile station device, a base station device, a communication method, and the like that enable the mobile station device and the base station device to perform efficient communication by appropriately allocating resource blocks at the base station.

REFERENCE SYMBOLS

100: Base station device
101a, 101b: Data control unit
102a, 102b: OFDM modulation unit
103a, 103b: Radio unit
104: Scheduling unit
105: Channel estimation unit
106: DFT-S-OFDM demodulation unit
107: Data extraction unit
108: Upper layer
200: Mobile station device
201: Data control unit
202: DFT-S-OFDM modulation unit
203a, 203b: Radio unit
204: Scheduling unit
205a, 205b: Channel estimation unit
206a, 206b: OFDM demodulation unit
207a, 207b: Data extraction unit
208: Upper layer
301: Physical mapping unit
302: Reference signal generation unit
303: Synchronization signal generation unit
304: Modulation unit
305: IFFT unit
306: CP insertion unit
307: D/A conversion unit
308: Radio transmission unit
401: Radio reception unit
402: A/D conversion unit
403: CP removal unit
404: FFT unit
405: Demodulation unit
501: Physical mapping unit
502: Reference signal generation unit
503: Synchronization signal generation unit
504-1, 504-2: Modulation unit
505-1, 505-2: IFFT unit
506-1, 506-2: CP insertion unit
507-1, 507-2: D/A conversion unit
508-1, 508-2: Radio transmission unit
601-1, 601-2: Radio reception unit
602-1, 602-2: A/D conversion unit
205b: Channel estimation unit
603-1, 603-2: Band-specific channel estimation unit
604-1, 604-2: CP removal unit
605-1, 605-2: FFT unit
606-1, 606-2: Demodulation unit
A1, A2: Antenna unit

The invention claimed is:

1. A base station device configured and/or programmed to communicate with a mobile station device, the base station device comprising:
    notifying circuitry configured and/or programmed to notify the mobile station device of information indicating a frequency bandwidth of each of a plurality of system bands to be used for the mobile station device to communicate with the base station device; and
    reception circuitry configured and/or programmed to receive, from the mobile station, channel quality indicators for each of the plurality of system bands, wherein
        each of the plurality of system bands includes a plurality of subbands, each of the subbands comprising a set of contiguous resource blocks,
        each of the channel quality indicators is derived to satisfy a condition assuming a subband of the plurality of subbands,
        for each of the plurality of system bands, the natural number, N, of the resource blocks within the subband is based on the frequency bandwidth of the corresponding system band, and the corresponding system band includes the subband, and
        in a case that the total number of resource blocks within the corresponding system band is not a multiple of N, N applies to all of the plurality of subbands within the corresponding system band except for one subband, and the number of resource blocks within the one subband is less than N.

2. The base station device according to claim 1, wherein N becomes larger as the frequency bandwidth of the corresponding system band is larger.

3. A mobile station device comprising:
acquiring circuitry configured and/or programmed to acquire information indicating a frequency bandwidth of each of a plurality of system bands to be used to communicate with a base station device; and
transmission circuitry configured and/or programmed to transmit channel quality indicators for each of the plurality of system bands, wherein
each of the plurality of system bands includes a plurality of subbands, each of the subbands comprising a set of contiguous resource blocks,
each of the channel quality indicators is derived to satisfy a condition assuming a subband of the plurality of subbands,
for each of the plurality of system bands, the natural number, N, of the resource blocks within the subband is based on the frequency bandwidth of the corresponding system band, and the corresponding system band includes the subband, and
in a case that the total number of resource blocks within the corresponding system band is not a multiple of N, N applies to all of the plurality of subbands within the corresponding system band except for one subband, and the number of resource blocks within the one subband is less than N.

4. The mobile station device according to claim 3, wherein N becomes larger step by step as the frequency bandwidth of the corresponding system band is larger.

5. A processing method to be performed by a base station device configured and/or programmed to communicate with a mobile station device, the processing method comprising:
notifying the mobile station device of information indicating a frequency bandwidth of each of a plurality of system bands to be used for the mobile station device to communicate with the base station device; and
receiving, from the mobile station, channel quality indicators for each of the plurality of system bands, wherein
each of the plurality of system bands includes a plurality of subbands, each of the subbands comprising a set of contiguous resource blocks,
each of the channel quality indicators is derived to satisfy a condition assuming a subband of the plurality of subbands,
for each of the plurality of system bands, the natural number, N, of the resource blocks within the subband is based on the frequency bandwidth of the corresponding system band, and the corresponding system band includes the subband, and
in a case that the total number of resource blocks within the corresponding system band is not a multiple of N, N applies to all of the plurality of subbands within the corresponding system band except for one subband, and the number of resource blocks within the one subband is less than N.

6. A processing method to be performed by a mobile station device, the processing method comprising:
acquiring information indicating a frequency bandwidth of each of a plurality of system bands to be used to communicate with a base station device; and
transmitting channel quality indicators for each of the plurality of system bands, wherein
each of the plurality of system bands includes a plurality of subbands, each of the subbands comprising a set of contiguous resource blocks,
each of the channel quality indicators is derived to satisfy a condition assuming a subband of the plurality of subbands,
for each of the plurality of system bands, the natural number, N, of the resource blocks within the subband is based on the frequency bandwidth of the corresponding system band, and the corresponding system band includes the subband, and
in a case that the total number of resource blocks within the corresponding system band is not a multiple of N, N applies to all of the plurality of subbands within the corresponding system band except for one subband, and the number of resource blocks within the one subband is less than N.

\* \* \* \* \*